United States Patent
Malik et al.

(10) Patent No.: US 12,506,796 B2
(45) Date of Patent: Dec. 23, 2025

(54) SUFFIX PROXIED WEB APPLICATION COLLABORATION

(71) Applicant: Microsoft Technology Licensing, LLC, Redmond, WA (US)

(72) Inventors: Vikas Malik, Kirkland, WA (US); Nir Mardiks Rappaport, Bellevue, WA (US); Meir Baruch Blachman, Jerusalem (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 15 days.

(21) Appl. No.: 18/536,427

(22) Filed: Dec. 12, 2023

(65) Prior Publication Data
US 2025/0193268 A1    Jun. 12, 2025

(51) Int. Cl.
G06F 15/16    (2006.01)
G06F 16/955    (2019.01)
H04L 9/40    (2022.01)
H04L 67/02    (2022.01)
H04L 67/56    (2022.01)

(52) U.S. Cl.
CPC ............ *H04L 67/02* (2013.01); *G06F 16/955* (2019.01); *H04L 63/10* (2013.01); *H04L 67/56* (2022.05)

(58) Field of Classification Search
None
See application file for complete search history.

(56) References Cited

U.S. PATENT DOCUMENTS

| | | | |
|---|---|---|---|
| 9,665,349 B2* | 5/2017 | Savage | G06F 8/30 |
| 10,389,528 B2* | 8/2019 | Moysi | H04L 63/0823 |
| 2020/0145499 A1* | 5/2020 | Kaplan | G06F 16/9538 |
| 2021/0081362 A1* | 3/2021 | Feijoo | G06F 16/176 |

(Continued)

OTHER PUBLICATIONS

Nethmi Wijesinghe, "Using Iframes vs Scripts for Embedding Components", retrieved from << https://blog.bitsrc.io/using-iframes-vs-scripts-for-embedding-components-e30eb569cb46 >>, May 5, 2021, 14 pages.

(Continued)

*Primary Examiner* — Phuoc H Nguyen
(74) *Attorney, Agent, or Firm* — Rainier Patents, P.S.

(57) ABSTRACT

In some embodiments, a collaboration feature overlays a web application by receiving a network communication that was redirected from the web application by a suffix proxy. The collaboration feature supplements or replaces activity of the web application by maintaining per-user-account activity states, deriving a shared collaboration state from the activity states, and supplying the shared collaboration state to multiple user accounts. The collaboration feature is installed without modifying the web application. The collaboration feature provides user accounts with a collaboration capability, such as shared document editing, chat rooms, shared calendars, or shared private workspaces. Some collaboration features overlay multiple web applications, even from different vendors, and some collaboration features support posting collaboratively created content to a website even when some contributors to the content are not registered users of the website. Some collaboration features impose stricter or different cybersecurity than an underlying website.

20 Claims, 6 Drawing Sheets

(56) References Cited

U.S. PATENT DOCUMENTS

2022/0103525 A1* 3/2022 Shribman .......... G06F 16/9566
2023/0177015 A1* 6/2023 Madisetti ............ G06F 16/182
707/608

OTHER PUBLICATIONS

"If a webpage contains an iFrame, would the iframe be loaded through the proxy server used to view the page?", retrieved from << https://webmasters.stackexchange.com/questions/87650/if-a-webpage-contains-an-iframe-would-the-iframe-be-loaded-through-the-proxy-se >>, Dec. 4, 2015, 2 pages.

Salaudeen Rajack, "How to Add Custom CSS or JavaScript to SharePoint Online Modern Page?", retrieved from << https://www.sharepointdiary.com/2020/11/add-custom-css-to-sharepoint-online-modern-page.html >>, May 7, 2023, 13 pages.

"Welcome to Colab!", retrieved from << https://colab.research.google.com/#scrollTo=Nma_JWh-W-IF >>, no later than Nov. 9, 2023, 5 pages.

"Feature request: Embedding google colab notebook as an iframe #1225", retrieved from << https://github.com/googlecolab/colabtools/issues/1225 >>, May 8, 2020, 7 pages.

"inject script inside iframe of different domain", retrieved from << https://stackoverflow.com/questions/15041820/inject-script-inside-iframe-of-different-domain >>, Feb. 23, 2013, 1 page.

"Proxy", retrieved from << https://developer.mozilla.org/en-US/docs/Web/JavaScript/Reference/Global_Objects/Proxy >>, no later than Nov. 9, 2023, 10 pages.

"JavaScript Proxies", retrieved from << https://www.programiz.com/javascript/proxies >>, no later than Nov. 9, 2023, 10 pages.

"How to overlay an iframe and allow click through", retrieved from << https://stackoverflow.com/questions/41418413/ how-to-overlay-an-iframe-and-allow-click-through >>, Jan. 1, 2017, 9 pages.

"Injecting content script in dynamically created iframe", retrieved from << https://stackoverflow.com/questions/23939547/injecting-content-script-in-dynamically-created-iframe >>, May 29, 2014, 2 pages.

"Is it possible to proxy iframe sub-resources with service workers?", retrieved from << https://stackoverflow.com/questions/37890185/is-it-possible-to-proxy-iframe-sub-resources-with-service-workers >>, Jun. 17, 2016, 2 pages.

"Are You A Victim Of An Injected Malicious Hidden Iframe?", retrieved from << https://www.zscaler.com/blogs/security-research/are-you-victim-injected-malicious-hidden-iframe >>, Mar. 4, 2010, 6 pages.

"How to setup suffix proxy server", retrieved from << https://stackoverflow.com/questions/3102333/how-to-setup-suffix-proxy-server >>, Jun. 23, 2010, 2 pages.

"Configure a proxy server", retrieved from << http://help.collab.net/index.jsp?topic=/csvn/action/svnedge_configureproxy.html >>, no later than Nov. 9, 2023, 1 page.

"Is it possible to use an iframe as an 'proxy'?", retrieved from << https://stackoverflow.com/questions/8752385/is-it-possible-to-use-an-iframe-as-an-proxy >>, Jan. 6, 2012, 2 pages.

"Iframe-html.com", retrieved from << https://www.iframe-html.com/ >>, no later than Nov. 9, 2023, 5 pages.

"10.18. Iframe Tool", retrieved from << https://edx.readthedocs.io/projects/edx-partner-course-staff/en/latest/exercises_tools/iframe.html >>, no later than Nov. 9, 2023, 5 pages.

"Wikipedia: Collaborations", retrieved from << https://en.wikipedia.org/wiki/Wikipedia:Collaborations >>, Mar. 26, 2023, 2 pages.

"List of collaborative software", retrieved from << https://en.wikipedia.org/wiki/List_of_collaborative_software >>, Apr. 26, 2023, 15 pages.

"Hooking", retrieved from << https://en.wikipedia.org/wiki/Hooking >>, Oct. 10, 2023, 10 pages.

"Wrapper library", retrieved from << https://en.wikipedia.org/wiki/Wrapper_library >>, Feb. 28, 2022, 3 pages.

"Method stub", retrieved from << https://en.wikipedia.org/wiki/Method_stub >>, Jul. 26, 2023, 2 pages.

"Web application", retrieved from << https://en.wikipedia.org/wiki/Web_application >>, Oct. 29, 2023, 3 pages.

"Public key certificate", retrieved from << https://en.wikipedia.org/wiki/Public_key_certificate >>, Nov. 2, 2023, 12 pages.

"Different Types of SSL Certificates Explained", retrieved from << https://www.sectigo.com/resource-library/different-types-of-ssl-certificates-explained >>, Jul. 30, 2020, 5 pages.

* cited by examiner

SUFFIX PROXIED WEB APPLICATION COLLABORATION

BACKGROUND

Orchestral music, films, buildings, roads, team sports, businesses, large computer programs, and many other items, are often partially or entirely a result of collaboration between people. The etymology of "collaboration" rests on the Latin words "com" meaning "with", and "laborare" meaning to labor or to work. Collaboration involves multiple people (possibly in multiple organizations) working together toward a shared goal.

Technology can facilitate collaboration in various ways. For example, any technology that facilitates communication between people can probably be used to facilitate collaboration. Likewise, any project management technology can probably be used to help manage collaboration.

However, there is still room for improvement in the field of collaboration technology.

SUMMARY

Some embodiments address technical challenges arising from efforts to improve collaboration technology for web applications. In some cases, challenges include cybersecurity vulnerabilities, a lack of access to web application source code, or a lack of particular collaboration capabilities in a given web application, for example.

In some embodiments, communications with one or more web applications are redirected by a suffix proxy to one or more collaboration feature implementations which overlay the web applications. This collaboration feature overlay architecture supports additional or otherwise different cybersecurity measures at a collaboration feature than exist at an underlying web application, even without access to the web application's source code. The collaboration feature implements capabilities which are not necessarily part of the underlying web application. The collaboration feature maintains per-user-account activity states, derives shared states from the activity states, and supplies the shared states to the collaborating user accounts, and hence to collaborating people who use those accounts. Suffix proxies, collaboration features, and web applications are specified and combined in various ways to enhance opportunities for collaboration.

Other technical activities and characteristics pertinent to teachings herein will also become apparent to those of skill in the art. The examples given are merely illustrative. This Summary is not intended to identify key features or essential features of the claimed subject matter, nor is it intended to be used to limit the scope of the claimed subject matter. Rather, this Summary is provided to introduce—in a simplified form—some technical concepts that are further described below in the Detailed Description. Subject matter scope is defined with claims as properly understood, and to the extent this Summary conflicts with the claims, the claims should prevail.

BRIEF DESCRIPTION OF THE DRAWINGS

A more particular description will be given with reference to the attached drawings. These drawings only illustrate selected aspects and thus do not fully determine coverage or scope.

DETAILED DESCRIPTION

Overview

Some teachings described herein were motivated by technical challenges faced and insights gained during efforts to improve technology for cloud application security. In particular, challenges were faced and insights were gained during efforts to improve Defender for Cloud Apps™, which is a security solution for software-as-a-service applications (mark of Microsoft Corporation). For example, one challenge was how to leverage proxy technology for more than security policy enforcement, and one insight was an architecture using a proxy to redirect web application communications of multiple user accounts through a single intervening collaboration feature, thereby overlaying the web application with the collaboration feature. These challenges and insights provided some motivations, but teachings herein are not limited in their scope or applicability to the particular motivational challenges or insights.

One limitation of many web applications is a lack of some desired collaboration capabilities. For example, in some scenarios a set of users of a social media web application would benefit from being able to collaborate on a draft web page, or a draft downloadable document, or another potential posting before it is released to a larger set of users, e.g., by being published on the social media application to all of their friends or to the world at large. Even if the social media web application provides some collaboration capability for the set of users, such as a group chat, other desirable collaboration capabilities are often missing, e.g., an ability to edit a shared document with markup and comments in a workspace that is private to the set of users in question.

In theory, a different web application might provide the desired capability. But in practice, factors such as a lack of integration with the social media web application, a lack of user subscriptions to the second application, and the logistics of transferring data between the two web applications, tend to hinder convenient and secure use of the second web application as a collaboration supplement to the first web application.

Figure 6:
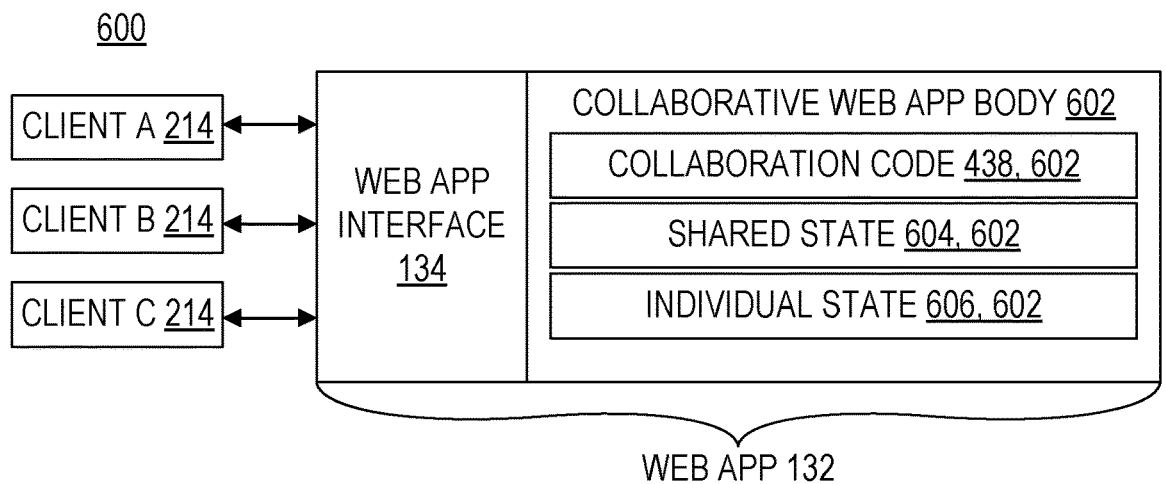
FIG. 6 is a data flow diagram illustrating a web application and client configuration.

When the collaboration technology available to the set of users is limited to an architecture like the one shown in FIG. 6, certain restrictions make it difficult to add or upgrade the collaboration capabilities. As indicated in FIG. 6, some built-in collaboration capabilities are implemented by collaboration code 438 with shared state data 604 and individual state data 606 in a body portion 602 of a web application 132. To add or upgrade the web application's built-in collaboration capabilities, one would necessarily gain access to source code of the app body 602, because the source code defines those built-in capabilities. One would also presumably have the active participation (or at least the clear permission) of the web application's vendor. Because collaboration sometimes involves preliminary versions not yet ready for publication, and other confidential information, a collaboration addition or upgrade sometimes includes a security addition or upgrade. Thus, one making a collaboration addition or upgrade would sometimes also have access to highly confidential security measures of the web application's vendor. But even when the web application's vendor is willing, other business priorities would sometimes delay or even prevent the changes to the body 602 that are desired by a set of users to enhance their collaboration beyond the existing built-in capabilities. In short, there are severe restrictions on changes to a web application's built-in collaboration capabilities.

Accordingly, other approaches are taught herein to improve the customizability, security, and usability of collaboration capabilities, beyond whatever capabilities happen to be built into a web application 132. These collaboration enhancements are accomplished in many embodiments without access to proprietary source code of the web application, and without modifying the web application's existing body 602.

Some embodiments described herein utilize or provide technology which performs a method of providing a collaboration feature which overlays a web application. The web application has a web application interface located at a web application interface URL. The method includes the collaboration feature automatically: receiving at a collaboration feature interface URL a communication that was redirected from the web application interface URL by operation of a suffix proxy; maintaining on a per-user-account basis collaboration feature activity states representing activities on the collaboration feature which are associated with the web application; deriving a shared collaboration state from respective collaboration activity states of multiple user accounts; and supplying a copy of at least a portion of the shared collaboration state to each of a plurality of the multiple user accounts.

This collaboration feature overlay functionality has the technical benefit of replacing or supplementing built-in collaboration capabilities of the web application without requiring any change to the web application itself. In particular, additional or replacement collaboration features can be implemented without access to the source code of the web application's body. Consequently, the ability to customize collaboration capabilities that interact with the web application is vastly increased.

In some embodiments, the collaboration feature overlay functionality restricts at least one of: an attempt by a user account to access the collaboration feature, or an attempt by the user account to access the shared collaboration state. The restricting includes imposing a cybersecurity access requirement that is not imposed on a successful attempt by the user account to access the web application directly at the web application interface URL. This collaboration feature overlay functionality has the technical benefit of providing greater security to collaboration feature data than the security which is provided by the web application to the web application data. For example, in some embodiments the draft shared documents and other confidential data of a collaboration feature are protected by quantum-resistant encryption even though the web application data is not protected at that level.

In some embodiments, the method of providing a collaboration feature which overlays a web application includes installing the collaboration feature without modifying the web application. Indeed, it is expected that many if not all embodiments will provide a collaboration feature overlaying a web application without requiring any change to the web application code. This collaboration feature overlay functionality has the technical benefit of maintaining the stability, usability, availability, and other functional characteristics of the web application itself when adding a new collaboration feature for use with the web application. Because the web application itself is not modified, there is very little risk of breaking it by adding the feature. The web application is also not taken offline in these scenarios, so the web application remains directly accessible to users who are not exercising the new collaboration feature.

In some embodiments, the collaboration feature is published by a first vendor, and the web application is published by a second vendor which differs from the first vendor. This has the technical benefit of greatly increasing the range and variety of collaboration feature sources (e.g., vendors and other organizations such as open source projects).

Another technical benefit is an increase in software quality compared to many single-vendor scenarios. The quality increase is a result of leveraging the technical expertise of different vendors for different parts of the architecture. For example, in one scenario a video conferencing collaboration functionality is provided by a vendor that is skilled and experienced in that technology, and is overlaid in the architecture on a web application which is provided by a vendor that has a different technical focus than video conferencing, such as a focus on geometric modeling, machine learning, stochastic simulations, or robotics.

In some embodiments, the collaboration feature overlays a plurality of web applications. Execution of the collaboration feature includes: receiving at a collaboration feature interface URL communications redirected from respective interfaces of each of the plurality of web applications; and deriving the shared collaboration state from respective collaboration activity states which collectively correspond to the plurality of web applications. This has the technical benefit of providing collaboration technology which spans different web applications.

In one scenario of collaboration spanning different web applications, a secure document editing collaboration feature overlays social media applications X and Y. Each user account in a user group of the collaboration feature corresponds to an X user account, or a Y user account, or a matched pair (i.e., one X user account, plus one Y user account which is registered to the same human user as the X user account). Web pages, images, textual remarks, or other shared documents are edited in the collaboration feature, and some of the edited documents are then posted to the social media applications X and Y.

In some embodiments, the collaboration feature includes a multi-user-account chat room which is accessible to at least three of the multiple user accounts for a shared chat, and the web application does not contain any multi-user-account chat room. In some, the collaboration feature includes a multi-user-account document editor which is accessible to at least three of the multiple user accounts for editing a shared document, and the web application does not contain any multi-user-account document editor. In some, the collaboration feature includes a multi-user-account shared event calendar which is accessible to at least three of the multiple user accounts, and the web application does not contain any multi-user-account shared event calendar. In some, the collaboration feature includes a multi-user-account shared project plan which is accessible to at least three of the multiple user accounts, and the web application does not contain any multi-user-account shared project plan. In some, the collaboration feature includes a multi-user-account shared checklist which is accessible to at least three of the multiple user accounts, and the web application does not contain any multi-user-account shared checklist. In some, the collaboration feature includes a multi-user-account video conference engine which is accessible to at least three of the multiple user accounts for video conferencing with one another, and the web application does not contain any multi-user-account video conference engine.

Each of these embodiments has the technical benefit of providing a collaboration functionality which is not provided by the underlying web application. Moreover, the collaboration functionality is integrated with the web application because the collaboration feature is on the communication path between a client and the web application, and the collaboration feature maintains activity states that are based on those communications, for each user-account of the collaboration feature. Each user-account of the collaboration feature thus implicates a user account of the web application.

These and other benefits will be apparent to one of skill from the teachings provided herein.

Operating Environments

Figure 1:
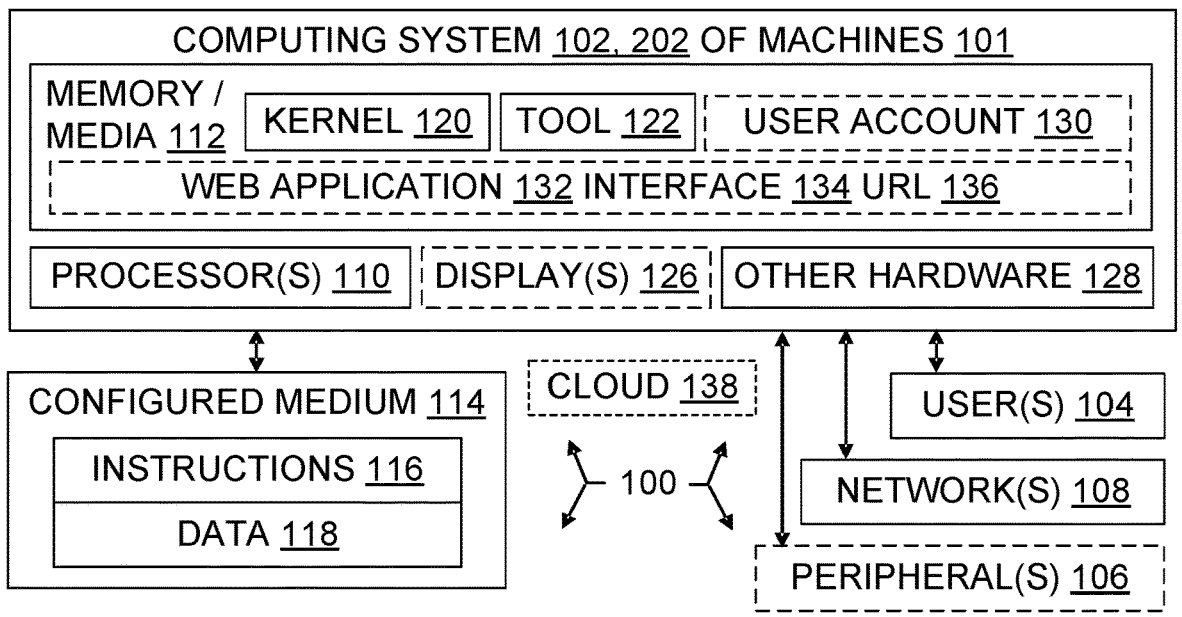
FIG. 1 is a diagram illustrating aspects of computer systems and also illustrating configured storage media, including some aspects generally suitable for systems which include or use collaboration feature overlay functionality.

With reference to FIG. 1, an operating environment 100 for an embodiment includes at least one computer system 102. The computer system 102 may be a multiprocessor computer system, or not. An operating environment may include one or more machines in a given computer system, which may be clustered, client-server networked, and/or peer-to-peer networked within a cloud 138. An individual machine is a computer system, and a network or other group of cooperating machines is also a computer system. A given computer system 102 may be configured for end-users, e.g., with applications, for administrators, as a server, as a distributed processing node, and/or in other ways.

Human users 104 sometimes interact with a computer system 102 user interface by using displays 126, keyboards 106, and other peripherals 106, via typed text, touch, voice, movement, computer vision, gestures, and/or other forms of I/O. Virtual reality or augmented reality or both functionalities are provided by a system 102 in some embodiments. A screen 126 is a removable peripheral 106 in some embodiments and is an integral part of the system 102 in some embodiments. The user interface supports interaction between an embodiment and one or more human users. In some embodiments, the user interface includes one or more of: a command line interface, a graphical user interface (GUI), natural user interface (NUI), voice command interface, or other user interface (UI) presentations, presented as distinct options or integrated.

System administrators, network administrators, cloud administrators, security analysts and other security personnel, operations personnel, developers, testers, engineers, auditors, and end-users are each a particular type of human user 104. In some embodiments, automated agents, scripts, playback software, devices, and the like running or otherwise serving on behalf of one or more humans also have user accounts, e.g., service accounts. Sometimes a user account is created or otherwise provisioned as a human user account but in practice is used primarily or solely by one or more services, such an account is a de facto service account. Although a distinction could be made, "service account" and "machine-driven account" are used interchangeably herein with no limitation to any particular vendor.

Storage devices or networking devices or both are considered peripheral equipment in some embodiments and part of a system 102 in other embodiments, depending on their detachability from the processor 110. In some embodiments, other computer systems not shown in FIG. 1 interact in technological ways with the computer system 102 or with another system embodiment using one or more connections to a cloud 138 and/or other network 108 via network interface equipment, for example.

Each computer system 102 includes at least one processor 110. The computer system 102, like other suitable systems, also includes one or more computer-readable storage media 112, also referred to as computer-readable storage devices 112. In some embodiments, tools 122 include security tools or software applications, on mobile devices 102 or workstations 102 or servers 102, editors, compilers, debuggers and other software development tools, as well as APIs, browsers, or webpages and the corresponding software for protocols such as HTTPS, for example. Files, APIs, endpoints, and other resources may be accessed by an account or set of accounts, user 104 or group of users 104, IP address or group of IP addresses, or other entity. Access attempts may present passwords, digital certificates, tokens or other types of authentication credentials.

Storage media 112 occurs in different physical types. Some examples of storage media 112 are volatile memory, nonvolatile memory, fixed in place media, removable media, magnetic media, optical media, solid-state media, and other types of physical durable storage media (as opposed to merely a propagated signal or mere energy). In particular, in some embodiments a configured storage medium 114 such as a portable (i.e., external) hard drive, CD, DVD, memory stick, or other removable nonvolatile memory medium becomes functionally a technological part of the computer system when inserted or otherwise installed, making its content accessible for interaction with and use by processor 110. The removable configured storage medium 114 is an example of a computer-readable storage medium 112. Some other examples of computer-readable storage media 112 include built-in RAM, ROM, hard disks, and other memory storage devices which are not readily removable by users 104. For compliance with current United States patent requirements, neither a computer-readable medium nor a computer-readable storage medium nor a computer-readable memory nor a computer-readable storage device is a signal per se or mere energy under any claim pending or granted in the United States.

The storage device 114 is configured with binary instructions 116 that are executable by a processor 110; "executable" is used in a broad sense herein to include machine code, interpretable code, bytecode, and/or code that runs on a virtual machine, for example. The storage medium 114 is also configured with data 118 which is created, modified, referenced, and/or otherwise used for technical effect by execution of the instructions 116. The instructions 116 and the data 118 configure the memory or other storage medium 114 in which they reside; when that memory or other computer readable storage medium is a functional part of a given computer system, the instructions 116 and data 118 also configure that computer system. In some embodiments, a portion of the data 118 is representative of real-world items such as events manifested in the system 102 hardware, product characteristics, inventories, physical measurements, settings, images, readings, volumes, and so forth. Such data is also transformed by backup, restore, commits, aborts, reformatting, and/or other technical operations.

Although an embodiment is described as being implemented as software instructions executed by one or more processors in a computing device (e.g., general purpose computer, server, or cluster), such description is not meant to exhaust all possible embodiments. One of skill will understand that the same or similar functionality can also often be implemented, in whole or in part, directly in hardware logic, to provide the same or similar technical effects. Alternatively, or in addition to software implementation, the technical functionality described herein can be performed, at least in part, by one or more hardware logic components. For example, and without excluding other implementations, some embodiments include one of more of: chiplets, hardware logic components 110, 128 such as Field-Programmable Gate Arrays (FPGAs), Application-Specific Integrated Circuits (ASICs), Application-Specific Standard Products (ASSPs), System-on-a-Chip components (SOCs), Complex Programmable Logic Devices (CPLDs), and similar components. In some embodiments, components are grouped into interacting functional modules based on their inputs, outputs, or their technical effects, for example.

In addition to processors 110 (e.g., CPUs, ALUs, FPUs, TPUs, GPUs, and/or quantum processors), memory/storage media 112, peripherals 106, and displays 126, some operating environments also include other hardware 128, such as batteries, buses, power supplies, wired and wireless network interface cards, for instance. The nouns "screen" and "display" are used interchangeably herein. In some embodiments, a display 126 includes one or more touch screens, screens responsive to input from a pen or tablet, or screens which operate solely for output. In some embodiments, peripherals 106 such as human user I/O devices (screen, keyboard, mouse, tablet, microphone, speaker, motion sensor, etc.) will be present in operable communication with one or more processors 110 and memory 112.

In some embodiments, the system includes multiple computers connected by a wired and/or wireless network 108. Networking interface equipment 128 can provide access to networks 108, using network components such as a packet-switched network interface card, a wireless transceiver, or a telephone network interface, for example, which are present in some computer systems. In some, virtualizations of networking interface equipment and other network components such as switches or routers or firewalls are also present, e.g., in a software-defined network or a sandboxed or other secure cloud computing environment. In some embodiments, one or more computers are partially or fully "air gapped" by reason of being disconnected or only intermittently connected to another networked device or remote cloud. In particular, collaboration feature overlay functionality 204 could be installed on an air gapped network and then be updated periodically or on occasion using removable media 114, or not updated at all. Some embodiments also communicate technical data or technical instructions or both through direct memory access, removable or non-removable volatile or nonvolatile storage media, or other information storage-retrieval and/or transmission approaches.

One of skill will appreciate that the foregoing aspects and other aspects presented herein under "Operating Environments" form part of some embodiments. This document's headings are not intended to provide a strict classification of features into embodiment and non-embodiment feature sets.

One or more items are shown in outline form in the Figures, or listed inside parentheses, to emphasize that they are not necessarily part of the illustrated operating environment or all embodiments, but interoperate with items in an operating environment or some embodiments as discussed herein. It does not follow that any items which are not in outline or parenthetical form are necessarily required, in any Figure or any embodiment. In particular, FIG. 1 is provided for convenience, inclusion of an item in FIG. 1 does not imply that the item, or the described use of the item, was known prior to the current disclosure.

In any later application that claims priority to the current application, reference numerals may be added to designate items disclosed in the current application. Such items may include, e.g., software, hardware, steps, processes, systems, functionalities, mechanisms, data structures, computational resources, programming languages, tools, workflows, or algorithm implementations, or other items in a computing environment, which are disclosed herein but not associated with a particular reference numeral herein. Corresponding drawings may also be added.

More about Systems

Figure 2:
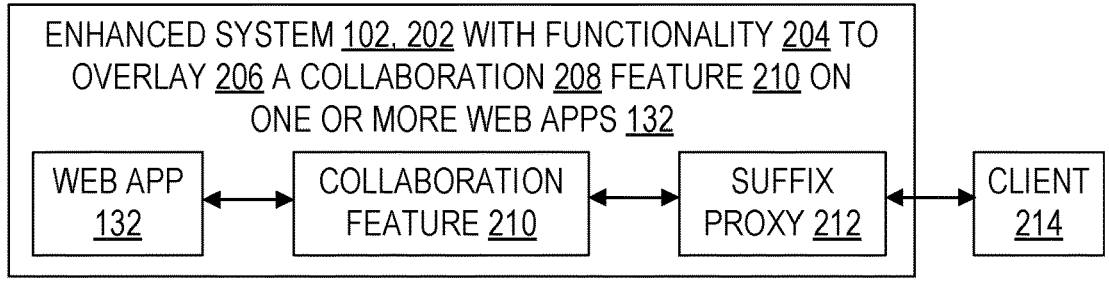
FIG. 2 is a block diagram illustrating aspects of a family of enhanced systems which are each configured with collaboration feature overlay functionality.

FIG. 2 illustrates a computing system 102 configured by one or more of the collaboration feature overlay functionality enhancements taught herein, resulting in an enhanced system 202. In some embodiments, this enhanced system 202 includes a single machine, a local network of machines, machines in a particular building, machines used by a particular entity, machines in a particular datacenter, machines in a particular cloud, or another computing environment 100 that is suitably enhanced. FIG. 2 items are discussed at various points herein, and additional details regarding them are provided in the discussion of a List of Reference Numerals later in this disclosure document.

Figure 3:
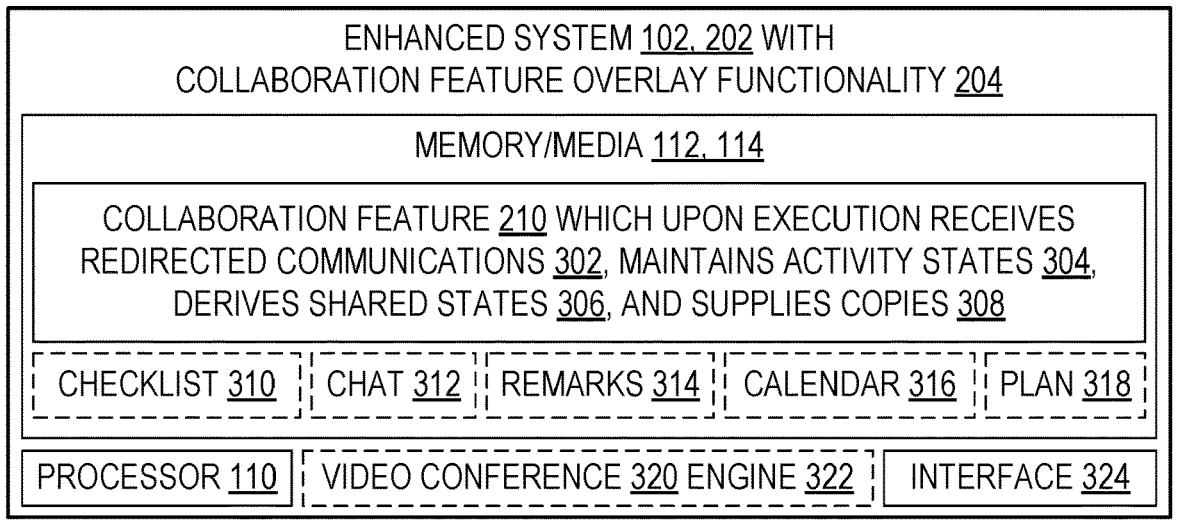
FIG. 3 is a block diagram illustrating aspects of another family of systems which are each enhanced with collaboration feature overlay functionality.

FIG. 3 shows some aspects of some enhanced systems 202. Like FIG. 2, FIG. 3 is not a comprehensive summary of all aspects of enhanced systems 202 or all aspects of collaboration feature overlay functionality 204. Nor is either figure a comprehensive summary of all aspects of an environment 100 or system 202 or other context of an enhanced system 202, or a comprehensive summary of any aspect of functionality 204 for potential use in or with a system 102. FIG. 3 items are discussed at various points herein, and additional details regarding them are provided in the discussion of a List of Reference Numerals later in this disclosure document.

Figure 4:
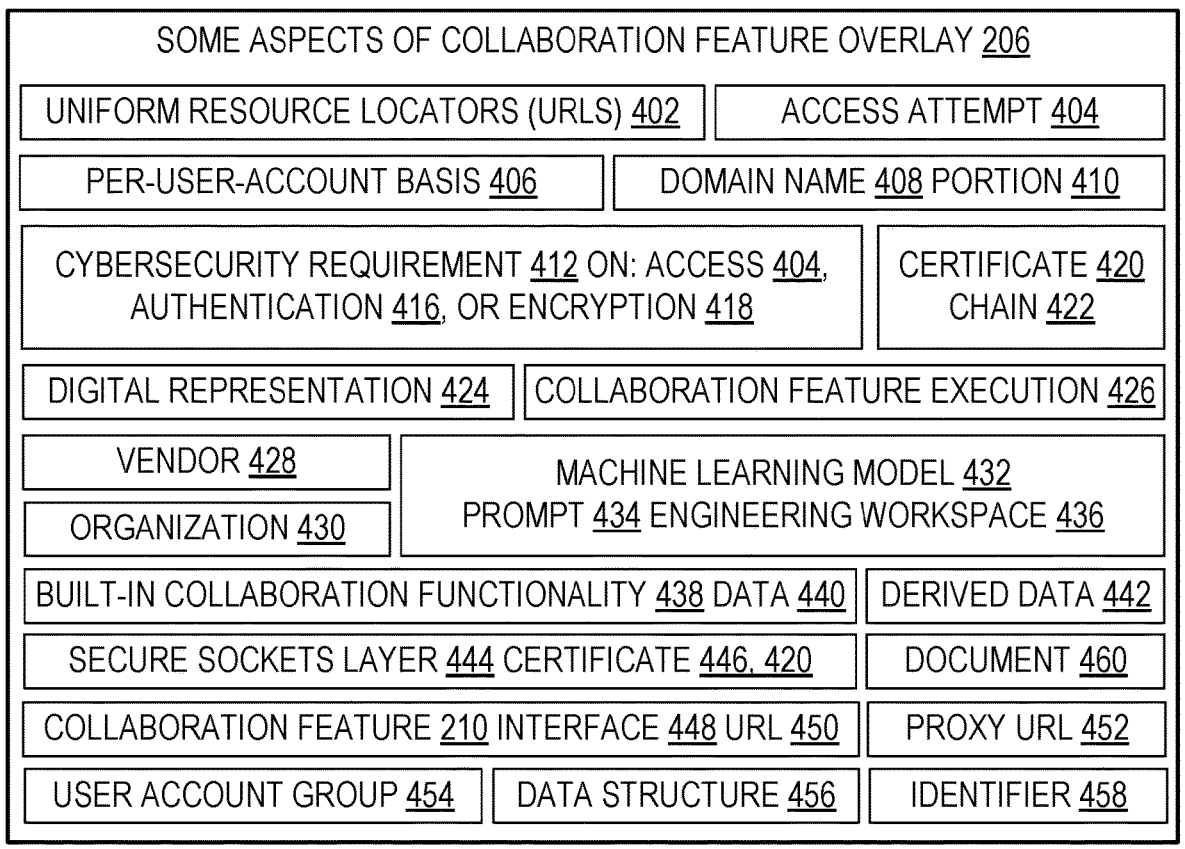
FIG. 4 is a block diagram illustrating some aspects of collaboration feature overlay methods and systems.

FIG. 4 shows some aspects of collaboration feature overlay 206 and related items or processes. This is not a comprehensive summary of all aspects of collaboration feature overlay 206. FIG. 4 items are discussed at various points herein, and additional details regarding them are provided in the discussion of a List of Reference Numerals later in this disclosure document.

Figure 5:
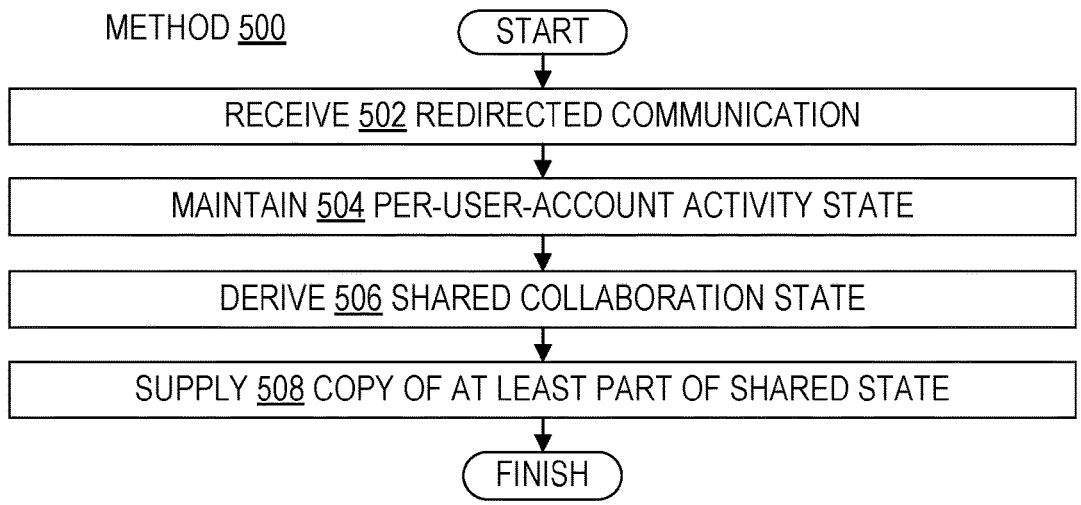
FIG. 5 is a flowchart illustrating steps in a collaboration feature overlay method.
Figure 12:
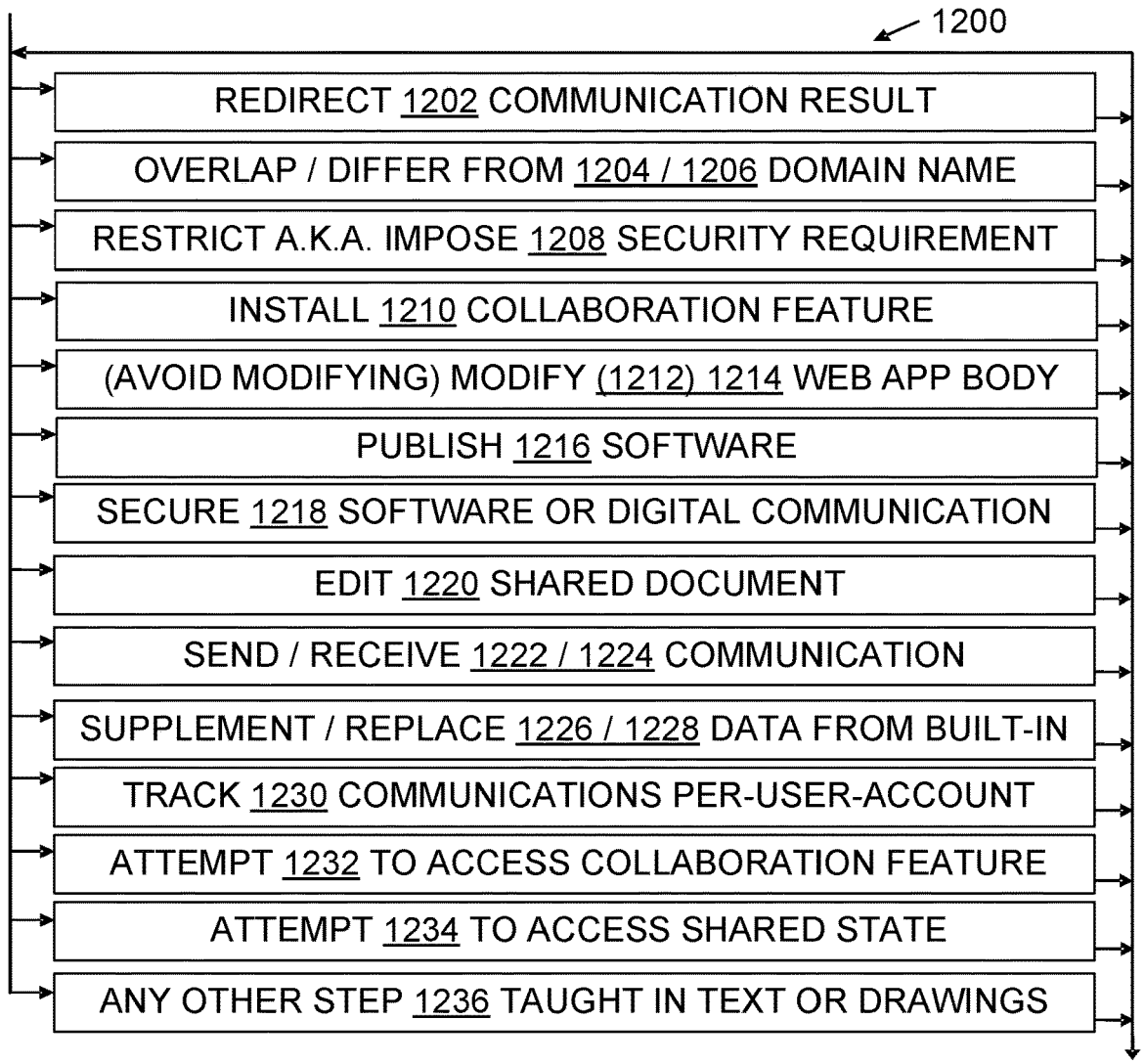
FIG. 12 is a flowchart further illustrating steps in some collaboration feature overlay methods, and incorporating FIG. 5.

The other figures are also relevant to systems 202. FIGS. 5 and 12 are flowcharts which illustrate methods of functionality 204 operation in systems 202. FIGS. 6 through 11 are data flow diagrams which illustrate both methods and programmed computer system components, to further describe functionality 204 in systems 202 or system 202 environments.

In some embodiments, the enhanced system 202 is networked through an interface 324. In some, an interface 324 includes hardware such as network interface cards, software such as network stacks, APIs, or sockets, combination items such as network connections, or a combination thereof.

Some embodiments include a computing system 202 which is configured with a collaboration feature 210 which overlays 206 a web application 132. The web application has a web application interface 134 located at a web application interface URL 136. The system 202 includes the collaboration feature, which has a collaboration feature interface 448 located at a collaboration feature interface URL 450. The system 202 also includes a digital memory set 112 including at least one digital memory 112, and a processor set 110 including at least one processor 110. The processor set is in operable communication with the digital memory set. The digital memory set contains multiple per-user-account basis collaboration feature activity states 304 collectively representing activities on the collaboration feature which are associated with the web application. The per-user-account basis collaboration feature activity states 304 are also referred to as individual states 304.

The processor set is configured by data and instructions to perform an execution 426 of the collaboration feature. The execution includes receiving 502 at the collaboration feature interface 448 a communication 302 that was redirected from the web application interface URL 136 by operation of a suffix proxy 212, maintaining 504 collaboration feature activity states 304 on a per-user-account basis 406, deriving 506 a shared collaboration state 306 from respective collaboration activity states of multiple user accounts 130, and supplying 508 a copy 308 of at least a portion of the shared collaboration state to each of a plurality of the multiple user accounts.

For example, in one scenario a web application 132 denoted here as ML provides its registered users with access to a machine learning model 432 in return for a per-prompt transaction fee. In this example, as elsewhere, activity by a "user" corresponds to computational activity in a computing system by or on behalf of a user account 130; human activity per se is not part of any embodiment claimed on the basis of the present disclosure. After registering with the ML site and providing a payment method (e.g., credit card information, or an advance payment for N transactions), a user is able to submit prompts 434 to the machine learning model through the web application's user interface 134.

In this example, the ML application 132 does not provide any mechanism for users to form groups 454, e.g., groups based on mutual interests, or groups based on employment in a particular sector or employment by a particular organization. From the ML application 132 perspective, each registered ML user account 130 stands on its own, with no particular connection to any other registered ML user account 130 aside from both accounts being registered to use the machine learning model 432.

However, with the benefit of teachings provided herein, a collaboration feature 210 which overlays 206 the ML web application 132 provides functionality for forming collaborative user groups 454. Part of the collaboration feature 210 user interface 448 supports group operations such as searching a list of existing groups, forming a new group, asking to join an existing group, responding to a request to join a group one has formed, and accessing a workspace which is shared by—and is only accessible to—members of a group in which the user is a member. Data structures 456 and other code inside the collaboration feature 210 implement the groups 454, e.g., by specifying which account formed the group and is thus (at least by default) the group admin, by specifying which account(s) belong to the group, and by implementing the group's shared workspace 436.

In this example, user accounts U1, U2, and U3 belong to a group G1 which is administered by U1. The members of group G1 share an interest in dessert recipes created with machine learning assistance.

In this example, collaboration feature 210 receives 502 at the collaboration feature interface 448 a communication 302 that was redirected from the ML web application interface URL 136 by operation of a suffix proxy 212. What the collaboration feature 210 then does with the communication 302 depends at least on the content of the communication. Communications that do not involve collaboration are simply forwarded to the ML application. Some examples of such non-collaborative communications are an account balance inquiry, a billing address change, and a command to show a history of the user accounts' prompts 434 together with the model's corresponding replies.

Communications that involve collaboration are automatically identified, e.g., by the presence of a key phrase 458 or tag 458 (e.g., "G1" or #Aldesserts) or by a preprocessing language model 432 of the collaboration feature 210 (a.k.a. the CF model). The CF model 432 is distinct from the ML application 132 model 432.

The collaboration communications are handled differently by the collaboration feature 210 than the non-collaborative communications. For example, collaboration communications are not necessarily forwarded to the ML application 132, but are handled instead by the CF without involving the ML.

In this example, part of a sequence of collaboration communications is shown below. The communications involve three user accounts, the collaboration feature (CF), and the ML application (ML). Corresponding computational activities are described in parentheses.

U1: "Have we done a dessert that combines chocolate, mint, and nuts?" (CF 210 identifies this communication as collaborative based on "we", adds 504 it to an individual state 304 of U1, adds 506 it to a shared chat workspace 306, 436 of the group G1, sends 508 a copy 308 of the chat to U2, and sends 508 a copy 308 of the chat to U3. A copy is already present in U1's browser. The communication is not forwarded to ML. In a variation, only the most recent part of the chat is sent 508, e.g., the most recent ten chat entries, or all chat entries within the past two days.)

U2: "I don't think so. We could try 'make me a recipe that combines chocolate, mint, and walnuts or pecans.' I don't like other nuts with chocolate." (CF identifies this communication as collaborative based on "we" and because the CF model classifies it as a response to the collaborative communication from U1. CF adds 504 this chat entry to an individual state 304 of U2, adds 506 it to the shared chat workspace 306 of the group G1, sends 508 a copy 308 of the chat to U1, and sends 508 a copy 308 of the chat to U3. A copy is already present in U2's browser. The communication is not forwarded to ML.)

After further discussion, the group G1 members agree on the following prompt: "Make a dessert recipe that combines at least chocolate, spearmint, and walnuts or pecans." They also agree it is U3's turn to submit a prompt to ML, so U3 sends the command shown below.

U3: "Submit this prompt: Make a dessert recipe that combines at least chocolate, spearmint, and walnuts or pecans." (CF identifies this as collaborative because the CF model classifies it as part of the collaborative group G1 discussion. CF identifies "Submit this prompt:" as a command to CF, and strips it out of the communication subsequently sent to ML. CF adds 504 the full chat entry to an individual state 304 of U3, adds 506 it to the shared chat workspace 306 of the group G1, sends 508 a copy 308 of the chat to U1, and sends 508 a copy 308 of the chat to U2. A copy is already present in U3's browser. The prompt portion of the communication "Make a dessert recipe that combines at least chocolate, spearmint, and walnuts or pecans." is forwarded to ML under the ML U3 account. In response, the ML application generates a recipe and replies to what the ML application views as the ML U3 account. The recipe communication from ML goes to CF due to the proxying. CF identifies the recipe communication as part of the U3 activity in group G1, as opposed to being part of U3 activity in a different group or U3 non-group activity. The identification as G1 activity is accomplished by context, or by including a sequence number 458 per an added part of the prompt not shown here, or by matching a string in the recipe communication to a string in the G1 chat, such as "dessert recipe", for example. The generated recipe is added 506 to the G1 chat, and copies 308 of the ML generated recipe are sent 508 to U1, U2, and U3.)

In some embodiments, the collaboration feature 210 is published 1216 by a first vendor 428, and the web application 132 is published by a second vendor 428 which differs from the first vendor. Accordingly, the functionality 204 is not inherently restricted to situations in which the collaboration feature and the web application it overlays are both under the control of the same vendor.

In some embodiments, the collaboration feature interface 448 is located at a collaboration feature interface URL 450, the collaboration feature interface URL is secured 1218 by a first secure sockets layer (SSL) 444 certificate 446 chain 422, and the web application interface URL 136 is simultaneously secured 1218 by a second secure sockets layer certificate chain 422 which differs from the first secure sockets layer certificate chain. Accordingly, the functionality 204 is not inherently restricted to situations in which the collaboration feature 210 and the web application 132 it overlays are both secured by (respective copies of) the same SSL certificate chain 422.

In some embodiments, the collaboration feature interface 448 is located at a collaboration feature interface URL 450, the collaboration feature interface URL is secured 1218 by a first certificate 420 assigned to a first organization 430, the web application interface URL 136 is secured 1218 by a second certificate 420 assigned to a second organization 430 which differs from the first organization, and each certificate 420 includes an extended validation secure sockets layer certificate or an organization validation secure sockets layer certificate. In one example scenario, the collaboration feature is secured using a Microsoft SSL certificate while the web app is secured using an SSL certificate from another company. In short, the functionality 204 is not inherently restricted to situations in which the collaboration feature 210 and the web application 132 it overlays are both secured by a cybersecurity certificate of the same single organization.

In some embodiments, the collaboration feature 210 overlays the web application 132, the collaboration feature is published by a first vendor 428, the web application is published by a second vendor 428 which differs from the first vendor, the collaboration feature also overlays a second web application 132, and the second web application is published by a third vendor 428 which differs from the second vendor and also differs from the first vendor.

In one example scenario, collaboration between users of two competing social media sites 132 is facilitated by a third-party collaboration feature 210. A user with an account on either or both of the social media sites can register as a CF user, that is, a user of the collaboration feature 210 that overlays both social media sites. Registered CF users collaboratively edit a shared document 460 without posting their edits and intervening drafts to either social media site. After agreement is reached on the document's content, the document is posted from the CF to both social media sites through social media user accounts of CF users. This has a technical benefit of permitting a user of one social media site to contribute to content that is posted on a different social media site, without themselves being registered on that different social media site.

In some embodiments, the collaboration feature 210 includes at least one of: a multi-user-account chat room 312; a multi-user-account document editor 1220 which upon execution edits a shared document 460; a multi-user-account shared event calendar 316; a multi-user-account shared project plan 318; a multi-user-account shared checklist 310; or a multi-user-account video conference 320 engine 322.

Some embodiments include the suffix proxy 212.

In some embodiments, the collaboration feature 210 resides on the same device 101 as the suffix proxy 212. In other embodiments, the CF 210 and suffice proxy 212 reside on different devices which communicate over a network.

Figure 7:
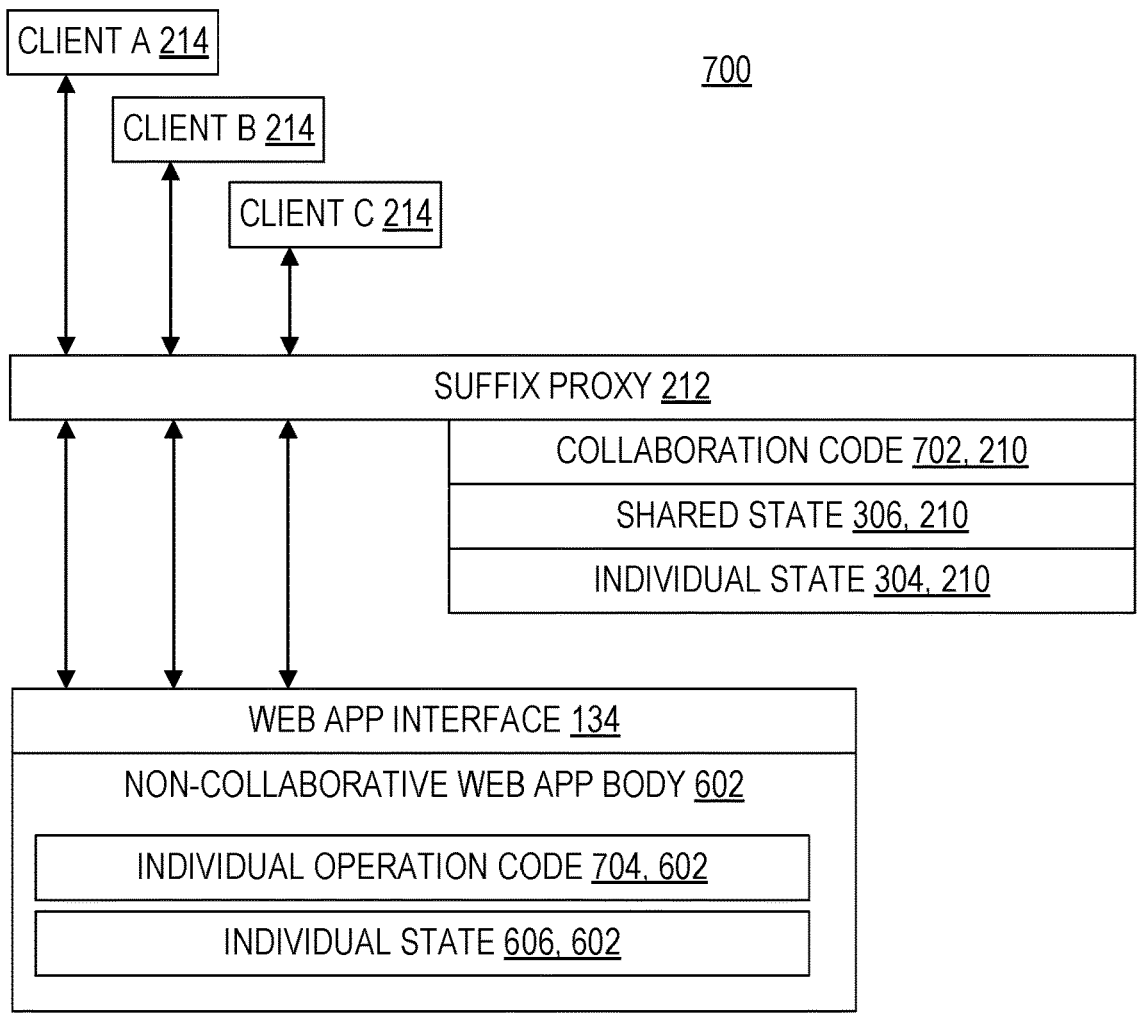
FIG. 7 is a data flow diagram illustrating a collaboration feature overlay architecture with a suffix proxy collaboration feature that supplements collaboration capabilities of a web application.
Figure 8:
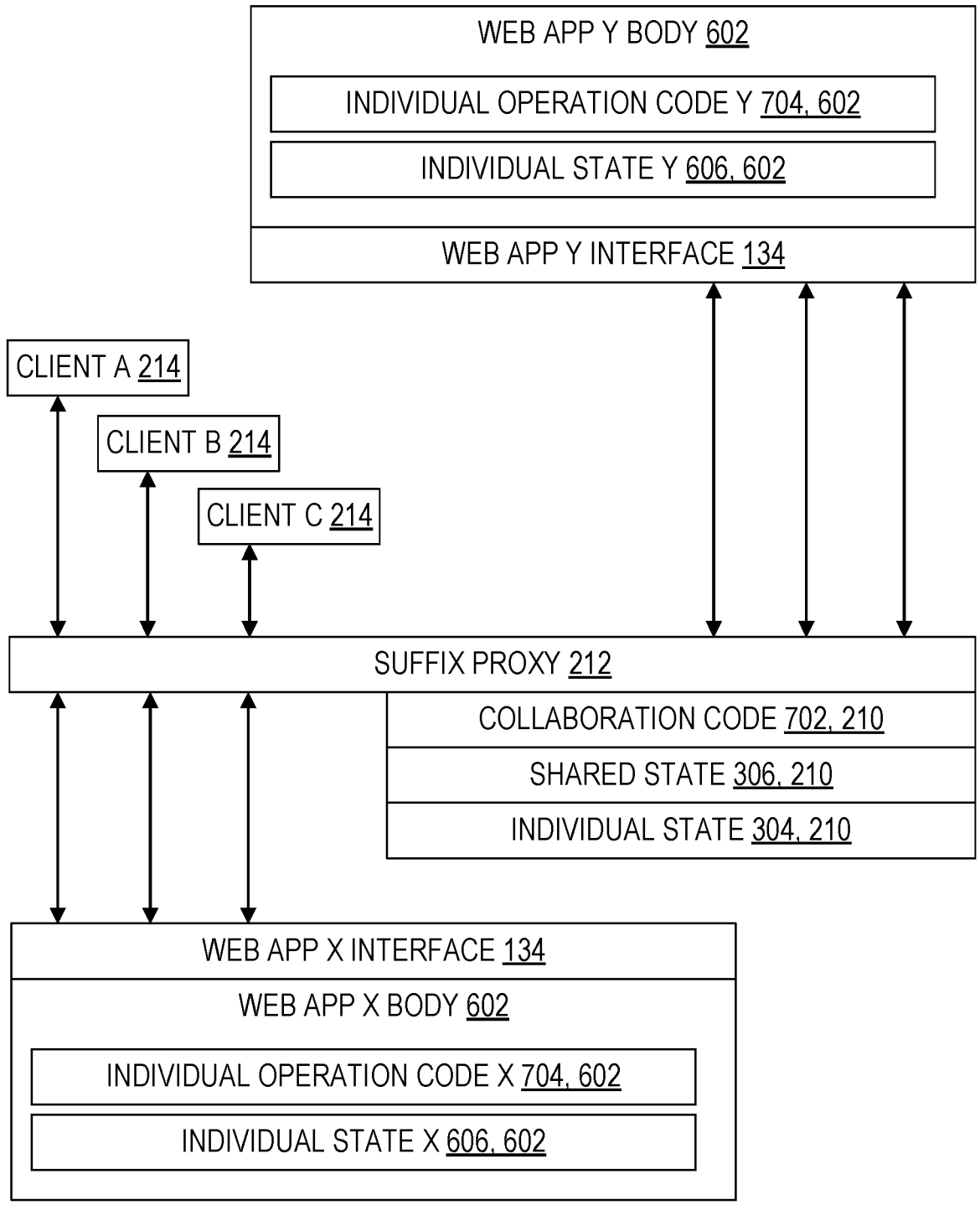
FIG. 8 is a data flow diagram illustrating a collaboration feature overlay architecture with a suffix proxy collaboration feature that supplements capabilities of two different web applications.

In some embodiments, the collaboration feature 210 software and the suffix proxy 212 software are integrated with each other, in that the collaboration feature 210 software includes an API that is invoked by the suffix proxy without necessarily utilizing a network connection; see, e.g., FIGS. 7 and 8. The API is not necessarily publicly addressable, e.g., the CF API 448 is not necessarily an URL 402. In some configurations, the suffix proxy address 452 serves in practice as a collaboration feature URL 450.

Figure 9:
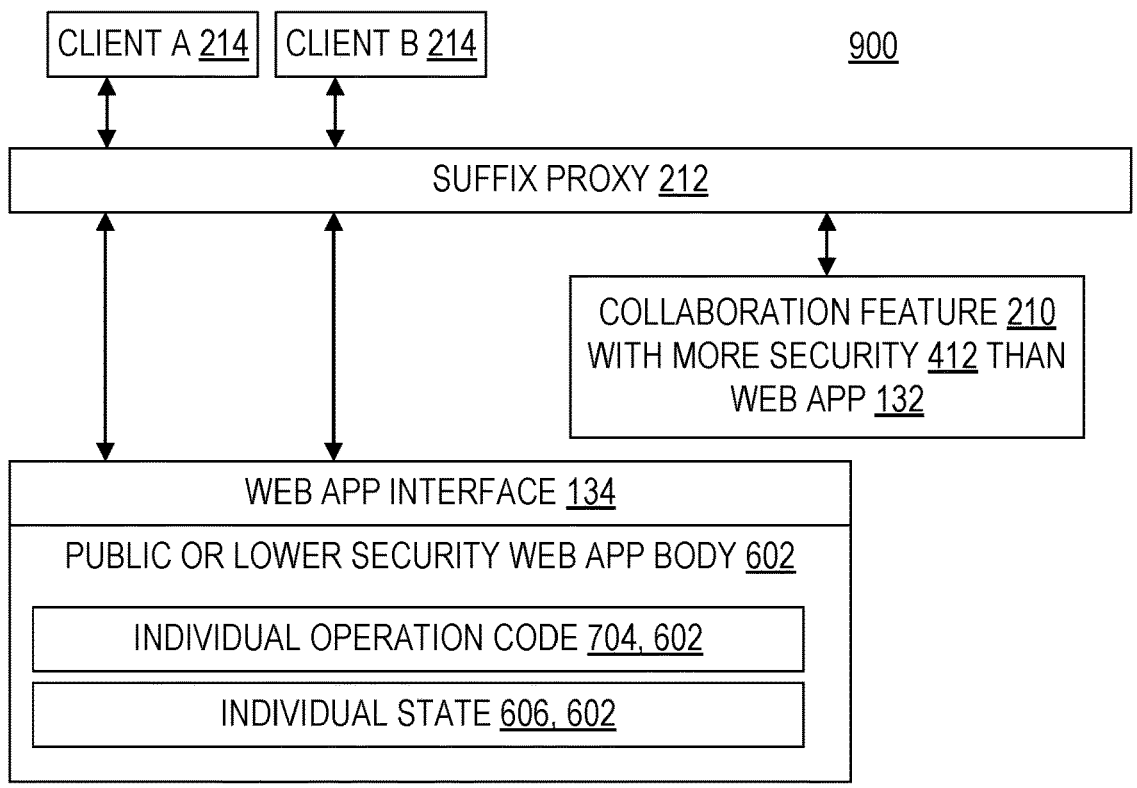
FIG. 9 is a data flow diagram illustrating a collaboration feature overlay architecture with a suffix proxy and a separate collaboration feature that supplements a cybersecurity capability of a web application.
Figure 10:
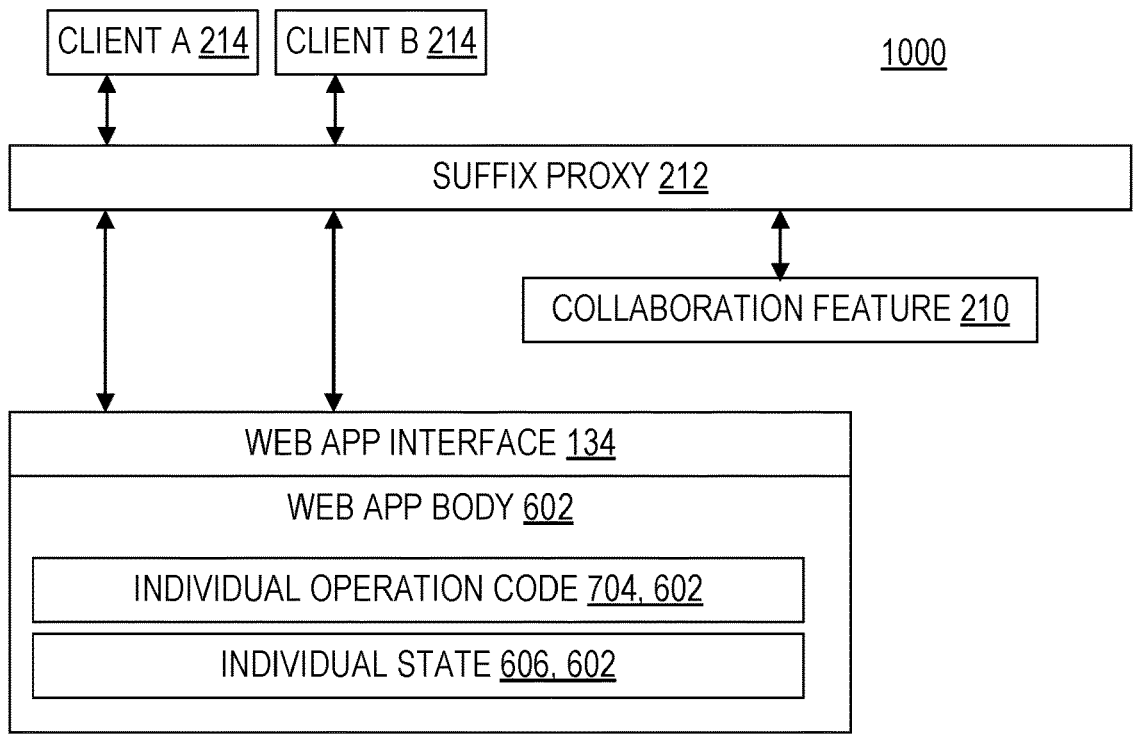
FIG. 10 is a data flow diagram illustrating a collaboration feature overlay architecture with a suffix proxy and a separate collaboration feature.
Figure 11:
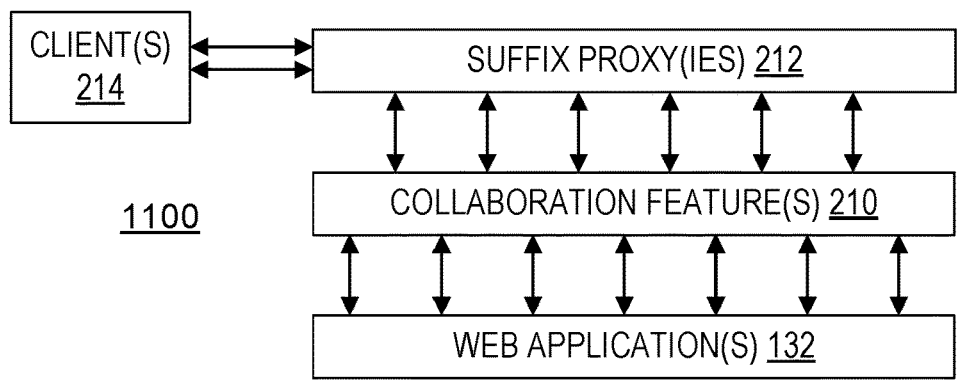
FIG. 11 is a data flow diagram illustrating a collaboration feature overlay architecture with one or more suffix proxies, one or more separate collaboration features, and one or more web applications.

In some embodiments, instead of being integrated with the suffix proxy software, the collaboration feature 210 software is a separate program; see, e.g., FIGS. 9 and 10.

Integration of CF software with suffix proxying software in a single program is orthogonal to the number of web applications overlaid and orthogonal to the collaborative capabilities of a web app, and these characteristics are also orthogonal to the security capabilities of an architecture. A characteristic X is orthogonal to a characteristic Y when the presence of X neither mandates nor prohibits the presence of Y. Thus, although it is not shown expressly, another functionality 204 architecture combines the non-collaborative web app body 602 in FIG. 7 with the non-integrated CF 210 shown in FIGS. 9 and 10. Similarly, although not shown expressly, another functionality 204 architecture combines the lower security web app body 602 in FIG. 9 with the proxy-integrated CF 210 shown in FIGS. 7 and 8. One of skill understands that other combinations of proxy integration/non-integration, web app built-in collaboration capabilities/lack thereof, and web app security capabilities or collaboration feature security capabilities, also embody teachings provided herein despite not being depicted expressly in the figures. In addition, the number of clients 214 shown is merely illustrative, not prescriptive.

FIG. 7 shows a collaboration feature overlay architecture. Instead of being built into the web app as in FIG. 6, the collaboration code is either built into a suffix proxy 212 or into a separate CF program 210 which communicates with the suffix proxy. This architecture provides users with access to collaboration functionality that the web app itself does not have. In an alternate scenario, corresponding to a variation of FIG. 7 in which the FIG. 6 web app with built-in collaboration code 438 replaces the on-collaborative web app of FIG. 7, the web app 132 does have some built-in collaboration functionality but the architecture provides additional collaboration functionality, replacement collaboration functionality, or more secure collaboration functionality.

In one example of additional collaboration functionality, the CF 210 provides a shared document editor, and no shared document editing capability is provided by the web app. In another example, the CF 210 provides a scrolling capability that is not provided by the web app.

In one example of replacement collaboration functionality, the CF 210 provides an editable shared calendar 316 which links draft unpublished web app posts to future dates, while the web app calendar only links current or past dates to existing published web app posts.

In one example of more secure collaboration functionality, the CF 210 includes a security tool to detect cross-site scripting, but the web app does not.

In some embodiments, the collaboration feature 210 includes a multi-user-account chat room 312 which is accessible to at least three of the multiple user accounts for a shared chat 312, and the web application 132 does not contain any multi-user-account chat room.

In some embodiments, the collaboration feature 210 includes a multi-user-account document editor 1220 which is accessible to at least three of the multiple user accounts for editing a shared document 460, and the web application 132 does not contain any multi-user-account document editor.

In some embodiments, the collaboration feature 210 includes a multi-user-account shared event calendar 316 which is accessible to at least three of the multiple user accounts, and the web application 132 does not contain any multi-user-account shared event calendar.

In some embodiments, the collaboration feature 210 includes a multi-user-account shared project plan 318 which is accessible to at least three of the multiple user accounts, and the web application 132 does not contain any multi-user-account shared project plan.

In some embodiments, the collaboration feature 210 includes a multi-user-account shared checklist 310 which is accessible to at least three of the multiple user accounts, and the web application 132 does not contain any multi-user-account shared checklist.

In some embodiments, the collaboration feature 210 includes a multi-user-account video conference engine 322 which is accessible to at least three of the multiple user accounts for video conferencing 320 with one another, and the web application 132 does not contain any multi-user-account video conference engine.

In some embodiments, the collaboration feature 210 includes a multi-user-account source code document editor 1220 which is accessible to at least three of the multiple user accounts for editing a shared source code document 460, and the web application 132 does not contain any multi-user-account source code document editor.

In some embodiments, the collaboration feature 210 includes a multi-user-account presentation document editor 1220 which is accessible to at least three of the multiple user accounts for editing a shared presentation document 460, and the web application 132 does not contain any multi-user-account presentation document editor.

In some embodiments, the collaboration feature 210 includes a multi-user-account spreadsheet document editor 1220 which is accessible to at least three of the multiple user accounts for editing a shared spreadsheet document 460, and the web application 132 does not contain any multi-user-account spreadsheet document editor.

In some embodiments, the collaboration feature 210 overlays a plurality of web applications 132, and the collaboration feature execution includes: receiving 502 at a collaboration feature interface URL 450 communications redirected from respective interfaces 134 of each of the plurality of web applications; and deriving 506 the shared collaboration state 306 from respective collaboration activity states 304 which collectively correspond to the plurality of web applications.

FIG. 8 illustrates an example in which the collaboration feature 210 overlays two web applications 132. Two is an example of a plurality. Collaboration across two web apps X and Y is shown in FIG. 8, but collaboration across three or more web apps is structured similarly in other embodiments.

In another example discussed above, a CF 210 overlays two competing social media apps 132, receives 502 at the CF interface URL 450 communications redirected from respective interfaces 134 of each of the social media applications, and derives 506 the shared collaboration state 306 (which includes a collaboratively edited document 460) from respective collaboration activity states 304 which collectively correspond to the social media applications.

In some embodiments, the web application 132 includes a generative machine learning model 432, and the collaboration feature 210 includes a secured collaborative prompt engineering workspace 436 that is accessible only to authenticated user accounts 130 of the collaboration feature. Security measures such as authentication measures, privilege or permission determination and enforcement measures, and encryption, are utilized in some embodiments to secure 1218 the collaborative prompt engineering workspace 436 so that it is accessible only to authenticated user accounts 130 of the collaboration feature.

Other system embodiments are also described herein, either directly or derivable as system versions of described processes or configured media, duly informed by the extensive discussion herein of computing hardware.

Although specific collaboration feature overlay architecture examples are shown in the Figures, an embodiment may depart from those examples. For instance, items shown in different Figures may be included together in an embodiment, items shown in a Figure may be omitted, functionality shown in different items may be combined into fewer items or into a single item, items may be renamed, or items may be connected differently to one another.

Examples are provided in this disclosure to help illustrate aspects of the technology, but the examples given within this document do not describe all of the possible embodiments. A given embodiment may include additional or different kinds of collaboration feature overlay functionality, for example, as well as different technical features, aspects, mechanisms, software, expressions, operational sequences, commands, data structures, programming environments, execution environments, environment or system characteristics, proxies, or other functionality consistent with teachings provided herein, and may otherwise depart from the particular examples provided.

Processes (a.k.a. Methods)

Processes (which are also be referred to as "methods" in the legal sense of that word) are illustrated in various ways herein, both in text and in drawing figures. FIGS. 5 and 12 each illustrate a family of methods 500 and 1200 respectively, which are performed or assisted by some enhanced systems, such as some systems 202 or another collaboration feature overlay functionality enhanced system as taught herein. Method family 500 is a proper subset of method family 1200.

Some variations on FIG. 5 include tracking 1230 communications on a per-user-account basis, in addition to maintaining per-user-account activity states 304. The activity states 304 do not necessarily reflect communications that reach the collaboration feature 210 but are not collaborative, e.g., checking the status of an individual CF account or an individual web app account. However, such non-collaborative activity in an account is tracked 1230 by the CF 210 in some embodiments. These are merely examples; as noted elsewhere, any operable combination of steps that are disclosed herein may be part of a given embodiment.

FIGS. 1 to 4 and FIGS. 6 to 11 illustrate collaboration feature overlay system 202 architectures with implicit or explicit actions, e.g., registering an account with a web app 132, registering an account with a collaboration feature 210, navigating to an URL 402 in a browser 122, displaying data or receiving data via a user interface 134, or otherwise processing data 118, in which the data 118 includes, e.g., network communications 302, digital security certificates 420, user account 130 data (user names, passwords, preferences, tokens, permission settings, etc.), and collaboratively shared content 306 (chat entries 312, shared document remarks 314, shared calendar events 316, etc.), among other examples disclosed herein.

Technical processes shown in the Figures or otherwise disclosed will be performed automatically, e.g., by an enhanced system 202, unless otherwise indicated. Related non-claimed processes may also be performed in part automatically and in part manually to the extent action by a human person is implicated, e.g., in some situations a human 104 types or speaks in natural language an input such as a chat entry, which is captured in the system 202 as digital audio and then converted to digital text. Natural language means a language that developed naturally, such as English, French, German, Hebrew, Hindi, Japanese, Korean, Spanish, etc., as opposed to designed or constructed languages such as HTML, Python, or other programming languages. Regardless, no process contemplated as an embodiment herein is entirely manual or purely mental; none of the claimed processes can be performed solely in a human mind or on paper. Any claim interpretation to the contrary is squarely at odds with the present disclosure.

In a given embodiment zero or more illustrated steps of a process may be repeated, perhaps with different parameters or data to operate on. Steps in an embodiment may also be done in a different order than the top-to-bottom order that is laid out in FIG. 12. FIG. 12 is a supplement to the textual examples of embodiments provided herein and the textual descriptions of embodiments provided herein. In the event of any alleged inconsistency, lack of clarity, or excessive breadth due to an aspect or interpretation of FIG. 12, the text of this disclosure shall prevail over that aspect or interpretation of FIG. 12.

Arrows in process or data flow figures indicate allowable flows; arrows pointing in more than one direction thus indicate that flow may proceed in more than one direction. Steps may be performed serially, in a partially overlapping manner, or fully in parallel within a given flow. In particular, the order in which flowchart 1200 action items are traversed to indicate the steps performed during a process may vary from one performance instance of the process to another performance instance of the process. The flowchart traversal order may also vary from one process embodiment to another process embodiment. Steps may also be omitted, combined, renamed, regrouped, be performed on one or more machines, or otherwise depart from the illustrated flow, provided that the process performed is operable and conforms to at least one claim of an application or patent that includes or claims priority to the present disclosure. To the extent that a person of skill considers a given sequence S of steps which is consistent with FIG. 12 to be non-operable, the sequence S is not within the scope of any claim. Any assertion otherwise is contrary to the present disclosure.

Some embodiments provide or utilize a method 1200 of providing a collaboration feature 210 which overlays a web application 132, the web application having a web application interface 134 located at a web application interface URL 136. This method includes the collaboration feature (i.e., the CF computing system 202) automatically at least: receiving 502 at a collaboration feature interface a communication that was redirected 1202 from the web application interface URL by operation of a suffix proxy; maintaining 504 on a per-user-account basis collaboration feature activity states representing activities on the collaboration feature which are associated with the web application; deriving 506 a shared collaboration state from respective collaboration activity states of multiple user accounts; and supplying 508 a copy of at least a portion of the shared collaboration state to each of a plurality of the multiple user accounts.

In some embodiments, the method 1200 includes: receiving 502 at an URL of the collaboration feature interface a communication that was redirected 1202 from the web application interface URL by operation of the suffix proxy, a collaboration feature interface URL 450 having a domain name 408 portion 410 which overlaps but differs from a domain name 408 portion 410 of the web application interface URL; receiving 502 at the collaboration feature interface URL a second communication that was redirected 1202 from a second web application interface URL by operation of a second suffix proxy, the collaboration feature interface URL domain name portion overlapping 1204 but differing 1206 from a second domain name portion of the second web application interface URL; maintaining 504 on the per-user-account basis collaboration feature the activity states representing activities on the collaboration feature which are associated with the web application; maintaining 504 on the per-user-account basis collaboration feature second activity states representing second activities on the collaboration feature which are associated with the second web application; deriving 506 a shared collaboration state from respective collaboration activity states of multiple user accounts representing the activities and the second activities; and supplying 508 the copy of at least a portion of the shared collaboration state to each of the plurality of the multiple user accounts.

In one example scenario, a shared comment 314 space 436 sits on top of (i.e., overlays) several social media sites 132. By utilizing this collaboration feature, a group 454 of users can read each other's postings from the social media sites in a separate pane not created by those sites, can post comments that are for only the group 454 and are not posted to any of the social media sites, and post other comments to any or all of the social media sites.

In another example scenario, a shared comment 314 space 436 sits on top of several search engine sites 132. By utilizing this collaboration feature, a group 454 of users can read each other's search results from the search engine sites in a separate pane not created by those sites, can post comments that are for only the group 454 and are not submitted to any of the search engine sites, and can submit searches to any or all of the search engine sites.

In some embodiments, the method 1200 includes redirecting 1202 the communication 302 from the web application interface URL 136 to the collaboration feature interface 448. Redirecting is accomplished using a suffix proxy, which may be implemented as a separate program or be integrated into a firewall, a router, or another network traffic routing tool 122.

In some embodiments, the method 1200 includes restricting 1208 at least one of: an attempt 1232 by a user account to access the collaboration feature, or an attempt 1234 by the user account to access the shared collaboration state, wherein the restricting includes imposing 1208 a cybersecurity access requirement that is not imposed on a successful attempt by the user account to access the web application directly at the web application interface URL.

For example, one embodiment provides a secured wiki page workspace 436 that is accessible only to authenticated users of the collaboration feature 210, on top of (i.e., overlaid on) a wiki that allows any registered user of the wiki to submit edits.

As another example, one embodiment provides a secured collaborative prompt engineering workspace 436 that is accessible only to authenticated users of the collaboration feature 210, on top of a large language model 432 that allows any registered user of the LLM (or in a variation, any member of the public) to submit prompts.

As another example, FIG. 9 illustrates an architecture in which the collaboration feature 210 has stricter cybersecurity than the web app 132. For example, in one scenario a collaboration feature from a trusted cybersecurity vendor such as Microsoft provides greater security for a shared workspace built on top of a public wiki.

In one variation, the suffix proxy 212 has equal or stricter cybersecurity than the web app 132, and in another variation, the suffix proxy 212 and the collaboration feature 210 each have equal or stricter cybersecurity than the web app 132. In one scenario, the web app 132 does not impose a multifactor authentication (MFA) 416 requirement 412, but the suffix proxy 212 or the collaboration feature 210 or both do impose an MFA requirement. In another scenario, the web app 132 utilizes 128-bit encryption 418, but the suffix proxy 212 or the collaboration feature 210 or both utilize 256-bit encryption. In yet another scenario, the web app 132 accepts logins from any device, but the suffix proxy 212 or the collaboration feature 210 or both only accept logins from devices that were previously registered with them by the user account that is attempting the login. In yet another scenario, the web app 132 imposes a voice recognition requirement 412, whereas the suffix proxy 212 or the collaboration feature 210 or both impose a fingerprint scan requirement. Many other examples of equal or stricter cybersecurity requirements will also be apparent to one of skill in the context of this disclosure.

In some embodiments, the method 1200 includes installing 1210 the collaboration feature 210 without modifying 1212 the web application 132. This is possible for two reasons. First, because the collaboration feature 210 code 702 and the collaboration states 304 and 306 reside outside the web app 132, no change to the web app body 602 is required to make the collaboration feature 210 operable. Second, because the collaboration feature 210 intercepts redirected communications 302, and forwards to the web app communications that do not directly invoke the collaboration feature's collaboration capabilities (e.g., web app account balance inquiries), no change to the web app interface 134 is required to make the collaboration feature 210 operable.

An installed CF 210 is a CF 210 that performs or upon execution will perform a method 1200 in response to real world or simulated redirected communications 302 and a real world or simulated web app 132.

When the suffix proxy is part of an embodiment, or the CF 210 is integrated with the suffix proxy, installing the CF 210 includes installing the suffix proxy, e.g., via proxy settings in a browser or an environment file.

In some embodiments, the supplying supplies 508 to each of the plurality of the multiple user accounts the copy of at least a portion of the shared collaboration state, and the shared collaboration state includes a digital representation 424 containing content from at least two of the multiple user accounts, the digital representation representing at least one of: a document 460, a chat 312, or a collection of remarks 314. In some embodiments, the remarks 314 pertain to a calendar 316, a project plan 318, a source code file, or another document 460.

Configured Storage Media

Some embodiments include a configured computer-readable storage medium 112. Some examples of storage medium 112 include disks (magnetic, optical, or otherwise), RAM, EEPROMS or other ROMs, and other configurable memory, including in particular computer-readable storage media (which are not mere propagated signals). In some embodiments, the storage medium which is configured is in particular a removable storage medium 114 such as a CD, DVD, or flash memory. A general-purpose memory, which is be removable or not, and is volatile or not, depending on the embodiment, can be configured in the embodiment using items such as routing tables, host files, domain names 408, URLs 402, IP addresses, network packets, collaboration feature executable code 702, collaboration feature individual states 304, collaboration feature shared state 306, collaboration workspaces 436, shared documents 460, and collaboration feature data structures 456, in the form of data 118 and instructions 116, read from a removable storage medium 114 and/or another source such as a network connection, to form a configured storage medium. The foregoing examples are not necessarily mutually exclusive of one another. The configured storage medium 112 is capable of causing a computer system 202 to perform technical process steps for providing or utilizing collaboration feature overlay functionality 204 as disclosed herein. The Figures thus help illustrate configured storage media embodiments and process (a.k.a. method) embodiments, as well as system and process embodiments. In particular, any of the method steps illustrated in FIGS. 5 to 12, or otherwise taught herein, may be used to help configure a storage medium to form a configured storage medium embodiment.

Some embodiments use or provide a computer-readable storage device 112, 114 configured with data 118 and instructions 116 which upon execution by a processor 110 cause a computing system 202 to perform a method 1200 of providing a collaboration feature 210 which overlays a web application 132, the web application having a web application interface 134 located at a web application interface URL 136. This method 1200 includes the collaboration feature automatically: receiving 502 at a collaboration feature interface URL a communication that was redirected 1202 from the web application interface URL by operation of a suffix proxy, a collaboration feature interface URL having a domain name portion which overlaps but differs from a domain name portion of the web application interface URL; tracking 1230 on a per-user-account basis communications with the collaboration feature via the collaboration feature interface URL; maintaining 504 on the per-user-account basis collaboration feature activity states representing activities on the collaboration feature which are associated with the web application; deriving 506 a shared collaboration state from respective collaboration activity states of multiple user accounts; and supplying 508 a copy of at least a portion of the shared collaboration state to each of a plurality of the multiple user accounts.

In some embodiments, the web application includes a built-in collaboration functionality 438 with a shared state 604, and the shared collaboration state 306 includes derived data 442 which is not available by operation of the web application built-in collaboration functionality.

For example, in one scenario the web app has a built-in remarks 314 capability that receives and posts remarks from different user accounts about a posting in one of the user accounts, but the CF 210 shared state 306 includes derived data 442 which contains a draft follow-up or rebuttal document 460 that is shared among a subset of the web app users via their respective CF 210 accounts. The draft follow-up or rebuttal document 460, 442 is not available by operation of the web application; it is only available by operation of the CF 210.

In some embodiments, the web application includes a built-in collaboration functionality 438 with a shared state 604, and the shared collaboration state 306 includes derived data 442 which replaces web application data that was produced by operation of the web application built-in collaboration functionality.

For example, in one scenario the web app has a built-in remarks 314 capability that receives and posts remarks from different user accounts about a posting in one of the user accounts, but the CF 210 shared state 306 includes derived data 442 which contains additional remarks (a.k.a. comments) that are shared among a subset of the web app users via their respective CF 210 accounts. These additional comments 314, 442 are not available by operation of the web application; they are only available by operation of the CF 210.

In some embodiments, the method 1200 further includes imposing 1208 a cybersecurity authentication 416 requirement 412 that is not imposed on a successful attempt by one of the multiple user accounts to access the web application directly at the web application interface URL.

In some embodiments, the method 1200 further includes imposing 1208 a cybersecurity encryption 418 requirement 412 that is not imposed by the web application.

Machine Learning Models, Including Language Models

A machine learning model 432 within or utilized by the CF 210 is not necessarily a large language model (LLM) in every embodiment, but it is an LLM in some embodiments. For present purposes, a language model is "large" if it has at least a billion parameters. For example GPT-2 (OpenAI), MegatronLM (NVIDIA), T5 (Google), Turing-NLG (Microsoft), GPT-3 (OpenAI), GPT-3.5 (OpenAI), and GPT-4 (OpenAI) are each a large language model (LLM) 432 for purposes of the present disclosure, regardless of any definitions to the contrary that may be present in the industry.

Language model stability is a consideration in some embodiments and some scenarios, particularly for a machine learning model 432 which resides within, or is utilized by, a collaboration feature 210. Instability leads to inconsistency in language model responses to prompts 434. Language model stability is sometimes dependent on language model parameters. Some different large language models have different stability parameters, and some exhibit different variability between answers to the same question even while using the same stability parameters. Some models 432 are stabilized by adjusting parameters such as temperature, frequency penalty, presence penalty, or nucleus sampling, and also or instead by constraining the queries sent to a given instance of the model 432.

Additional Observations

Additional support for the discussion of collaboration feature overlay functionality 204 herein is provided under various headings. However, it is all intended to be understood as an integrated and integral part of the present disclosure's discussion of the contemplated embodiments.

One of skill will recognize that not every part of this disclosure, or any particular details therein, are necessarily required to satisfy legal criteria such as enablement, written description, best mode, novelty, nonobviousness, inventive step, or industrial applicability. Any apparent conflict with any other patent disclosure, even from the owner of the present subject matter, has no role in interpreting the claims presented in this patent disclosure. With this understanding, which pertains to all parts of the present disclosure, examples and observations are offered herein.

Some embodiments utilize or provide a collaboration feature tool 210 which is made available for use as an overlay 206 of any web application by employing a suffix proxy. A suffix proxy allows a user to access web content by appending the name of the proxy server to the domain of the URL of the requested content. For example, a website at the uniform resource locator (URL) domain name 408 "application.com" is accessed as "application.com.reverseproxy.com" when it is proxied via the suffix "*.reverseproxy.com". The suffix is also referred to without the asterisk, as ".reverseproxy.com" or as "suffix reverseproxy.com".

Using a suffix proxy as a hook facilitates building a wide variety of collaboration tools. These tools, also referred to as collaboration features 210, overlay website(s) 132 such that when a website is accessed through the suffix the CF 210 capabilities are available for collaboration activities involving actual or proposed content of the website.

In one example scenario, a user accesses a ContosoSaaS.com page, e.g. https://contoso.contososaas.com/commonsite via a suffix as https://contoso.contososaas.com.reverseproxy.com/commonsite. As noted elsewhere, these URLs are merely examples to illustrate teachings herein, and are not intended to bring into this patent disclosure any content outside the four corners of this patent disclosure. With ContosoSaaS is now suffixed, an embodiment injects HTML and script code to provide an overlay iframe which also interacts with ContosoSaaS content via inter-frame communication. The overlay iframe is hosted at another domain, e.g., comments.reverseproxy.com. In some embodiments, a hook such as js-wrapper.js provides a convenient point for adding CF 210 code which generates an iframe on a web page and gives an embodiment access to collaborative code 702.

This example embodiment provides user accounts with functionality 204 to add comments 314 and to converse among themselves about the ContosoSaaS page. In this example, the comments are persisted. In this example, the comments are also indexed to the ContosoSaaS page such that when same page is opened again through suffix proxying by the same user or another CF 210 user, the comments or conversation will again be visible.

In addition to or instead of comments, such collaboration feature overlays are useful to implement collaboration applications such as chat, group-chat, brainstorming, task management, reminders, etc. Moreover, in some embodiments these collaboration application results are presented within the context of a specific page in a particular web application 132.

Since it is built with suffix proxying, collaboration feature overlay functionality can be used with any browser 122.

In some embodiments, an enhanced proxy server 212 injects a CF editing function 210 as an iframe of a proxy page, and manages collaboration edits from multiple clients 214 that access the proxy page with a proxy URL.

In some embodiments, a proxy sever generates a proxy URL, injects into a proxy page an iframe with a CF script 210 configured to receive editing input, sends 508 a first instance of the proxy page to a first client, sends 508 a second instance of the proxy page to a second client, receives 502 a first editing input via a first iframe of the first instance of the proxy page, receives 502 a second editing input via a second iframe of the second instance of the proxy page; stores 506 the first editing input and the second editing input in an updated proxy page 306, sends 508 a first instance of the updated proxy page to the first client, and sends 508 a second instance of the updated proxy page to the second client.

Some embodiments leverage a proxy solution 212 to inject a collaboration capabilities implementation 210 on top of web applications 132 without requiring 1212 any change on or in or by the application 132. Some embodiments perform or utilize a method of adding a collaboration feature to an existing application, the application having an interface located at an interface URL and having existing application code, the method including computationally: inserting 1202 a redirection from the interface URL to a collaboration feature URL, the redirection utilizing a suffix proxy URL; providing 1210 a collaboration feature at the collaboration feature URL, without modifying 1212 the existing application code; maintaining 504 respective collaboration activity states 304 on a per-user basis in response to accesses 404 to the collaboration feature URL; combining 506 respective collaboration activity states 304 of multiple users to form a shared collaboration state 306, without modifying 1212 the existing application code; and supplying 508 each of the multiple users with a copy of at least a portion of the shared collaboration state.

Internet of Things

In some embodiments, the system 202 is, or includes, an embedded system such as an Internet of Things system. "IoT" or "Internet of Things" means any networked collection of addressable embedded computing or data generation or actuator nodes. An individual node is referred to as an internet of things device 101 or IoT device 101 or internet of things system 102 or IoT system 102. Such nodes are examples of computer systems 102 as defined herein, and may include or be referred to as a "smart" device, "endpoint", "chip", "label", or "tag", for example, and IoT may be referred to as a "cyber-physical system". In the phrase "embedded system" the embedding referred to is the embedding of a processor and memory in a device, not the embedding of debug script in source code.

IoT nodes and systems typically have at least two of the following characteristics: (a) no local human-readable display; (b) no local keyboard; (c) a primary source of input is sensors that track sources of non-linguistic data to be uploaded from the IoT device; (d) no local rotational disk storage—RAM chips or ROM chips provide the only local memory; (e) no CD or DVD drive; (f) being embedded in a household appliance or household fixture; (g) being embedded in an implanted or wearable medical device; (h) being embedded in a vehicle; (i) being embedded in a process automation control system; or (j) a design focused on one of the following: environmental monitoring, civic infrastructure monitoring, agriculture, industrial equipment monitoring, energy usage monitoring, human or animal health or fitness monitoring, physical security, physical transportation system monitoring, object tracking, inventory control, supply chain control, fleet management, or manufacturing. IoT communications may use protocols such as TCP/IP, Constrained Application Protocol (CoAP), Message Queuing Telemetry Transport (MQTT), Advanced Message Queuing Protocol (AMQP), HTTP, HTTPS, Transport Layer Security (TLS), UDP, or Simple Object Access Protocol (SOAP), for example, for wired or wireless (cellular or otherwise) communication. IoT storage or actuators or data output or control may be a target of unauthorized access, either via a cloud, via another network, or via direct local access attempts.

Technical Character

The technical character of embodiments described herein will be apparent to one of ordinary skill in the art, and will also be apparent in several ways to a wide range of attentive readers. Some embodiments address technical activities such as redirecting 1202 network communications 302, providing a shared digital workspace 436, imposing 1208 cybersecurity requirements 412 in a computing system 102, tracking 1230 network communications 302, and installing 1210 software 702, which are each an activity deeply rooted in computing technology. Some of the technical mechanisms discussed include, e.g., a suffix proxy 212, a web application interface 134, collaboration code 702, machine learning models 432, digital certificates 420, and video conference engines 322. Some of the technical effects discussed include, e.g., addition of a collaboration capability to a website without modifying that website, replacement of a collaboration capability of a website without modifying that website, provision of a collaboration capability that spans multiple websites from different respective vendors, and an enhancement to the security of a web application. Thus, purely mental processes and activities limited to pen-and-paper are clearly excluded. Other advantages based on the technical characteristics of the teachings will also be apparent to one of skill from the description provided.

One of skill understands that internet communication and web application activity generally are technical activities which cannot be performed mentally, because they require transmitting or receiving data over a network 108, and otherwise altering the state of computing system memory 112. As disclosed herein, some collaboration feature overlay embodiments also involve redirection of network communications, which cannot be performed mentally or manually. Some collaboration feature overlay embodiments also involve installing CF software 210, imposing 1208 cybersecurity requirements, tracking 1230 network communications, executing a machine learning model, or other computational activities which cannot be performed mentally or manually. One of skill also understands that attempting to perform a derivation 506 of a shared collaboration state 306 even in part manually would create unacceptable delays in program execution, pose security risks, and introduce a severe risk of unacceptable human errors. People manifestly lack the speed, accuracy, memory capacity, and specific processing capabilities required to perform collaboration feature overlay.

In particular, collaboration feature overlay computational activity as described herein is a part of computing technology. Hence, the collaboration technology improvements such as functionality 204 described herein are improvements to computing technology.

Different embodiments provide different technical benefits or other advantages in different circumstances, but one of skill informed by the teachings herein will acknowledge that particular technical advantages will likely follow from particular embodiment features or feature combinations, as noted at various points herein. Any generic or abstract aspects are integrated into a practical collaboration feature application such as shared document editor 210, a shared calendar 316, a chat room 312, or another collaborative workspace 436 tool 210 which is not provided by any of the web applications 132 underlying the collaborative workspace tool.

Some embodiments described herein may be viewed by some people in a broader context. For instance, concepts such as efficiency, reliability, user satisfaction, or waste may be deemed relevant to a particular embodiment. However, it does not follow from the availability of a broad context that exclusive rights are being sought herein for abstract ideas, they are not.

Rather, the present disclosure is focused on providing appropriately specific embodiments whose technical effects fully or partially solve particular technical problems, such as how to facilitate collaboration across two or more web applications, how to improve the security of a web application without modifying the web application, how to enable a group of website users to confidentially edit a shared document before an agreed-upon version of the edited document is posted to the website, and how to supplement or replace a capability of a web application without modifying the web application. Other configured storage media, systems, and processes involving efficiency, reliability, user satisfaction, or waste are outside the present scope. Accordingly, vagueness, mere abstractness, lack of technical character, and accompanying proof problems are also avoided under a proper understanding of the present disclosure.

Additional Combinations and Variations

Any of these combinations of software code, data structures, logic, components, communications, and/or their functional equivalents may also be combined with any of the systems and their variations described above. A process may include any steps described herein in any subset or combination or sequence which is operable. Each variant may occur alone, or in combination with any one or more of the other variants. Each variant may occur with any of the processes and each process may be combined with any one or more of the other processes. Each process or combination of processes, including variants, may be combined with any of the configured storage medium combinations and variants described above.

More generally, one of skill will recognize that not every part of this disclosure, or any particular details therein, are necessarily required to satisfy legal criteria such as enablement, written description, or best mode. Also, embodiments are not limited to the particular scenarios, motivating examples, operating environments, tools, peripherals, software process flows, identifiers, repositories, data structures, data selections, naming conventions, notations, control flows, or other implementation choices described herein. Any apparent conflict with any other patent disclosure, even from the owner of the present subject matter, has no role in interpreting the claims presented in this patent disclosure.

Note Regarding Hyperlinks

Portions of this disclosure refer to URLs, hyperlinks, IP addresses, and/or other items which might be considered browser-executable codes. These items are included in the disclosure for their own sake to help describe some embodiments, rather than being included to reference the contents of the web sites or files that they identify. Applicants do not intend to have any URLs, hyperlinks, IP addresses, or other such codes be active links. None of these items are intended to serve as an incorporation by reference of material that is located outside this disclosure document. Thus, there should be no objection to the inclusion of these items herein. To the extent these items are not already disabled, it is presumed the Patent Office will disable them (render them inactive as links) when preparing this document's text to be loaded onto its official web database. See, e.g., United States Patent and Trademark Manual of Patent Examining Procedure § 608.01 (VII).

Acronyms, Abbreviations, Names, and Symbols

Some acronyms, abbreviations, names, and symbols are defined below. Others are defined elsewhere herein, or do not require definition here in order to be understood by one of skill.

ALU: arithmetic and logic unit
API: application program interface
BIOS: basic input/output system
CD: compact disc
CPU: central processing unit
DVD: digital versatile disk or digital video disc
FPGA: field-programmable gate array
FPU: floating point processing unit
GDPR: General Data Protection Regulation
GPU: graphical processing unit
GUI: graphical user interface
HTTPS: hypertext transfer protocol, secure
IaaS or IAAS: infrastructure-as-a-service
LAN: local area network
OS: operating system
PaaS or PAAS: platform-as-a-service
RAM: random access memory
ROM: read only memory
TPU: tensor processing unit
UEFI: Unified Extensible Firmware Interface
UI: user interface
WAN: wide area network Some Additional Terminology Reference is made herein to exemplary embodiments such as those illustrated in the drawings, and specific language is used herein to describe the same. But alterations and further modifications of the features illustrated herein, and additional technical applications of the abstract principles illustrated by particular embodiments herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage (particularly in non-technical usage), or in the usage of a particular industry, or in a particular dictionary or set of dictionaries. Reference numerals may be used with various phrasings, to help show the breadth of a term. Sharing a reference numeral does not mean necessarily sharing every aspect, feature, or limitation of every item referred to using the reference numeral. Omission of a reference numeral from a given piece of text does not necessarily mean that the content of a Figure is not being discussed by the text. The present disclosure asserts and exercises the right to specific and chosen lexicography. Quoted terms are being defined explicitly, but a term may also be defined implicitly without using quotation marks. Terms may be defined, either explicitly or implicitly, here in the Detailed Description and/or elsewhere in the application file.

A "computer system" (a.k.a. "computing system") may include, for example, one or more servers, motherboards, processing nodes, laptops, tablets, personal computers (portable or not), personal digital assistants, smartphones, smartwatches, smart bands, cell or mobile phones, other mobile devices having at least a processor and a memory, video game systems, augmented reality systems, holographic projection systems, televisions, wearable computing systems, and/or other device(s) providing one or more processors controlled at least in part by instructions. The instructions may be in the form of firmware or other software in memory and/or specialized circuitry.

A "multithreaded" computer system is a computer system which supports multiple execution threads. The term "thread" should be understood to include code capable of or subject to scheduling, and possibly to synchronization. A thread may also be known outside this disclosure by another name, such as "task," "process," or "coroutine," for example. However, a distinction is made herein between threads and processes, in that a thread defines an execution path inside a process. Also, threads of a process share a given address space, whereas different processes have different respective address spaces. The threads of a process may run in parallel, in sequence, or in a combination of parallel execution and sequential execution (e.g., time-sliced).

A "processor" is a thread-processing unit, such as a core in a simultaneous multithreading implementation. A processor includes hardware. A given chip may hold one or more processors. Processors may be general purpose, or they may be tailored for specific uses such as vector processing, graphics processing, signal processing, floating-point arithmetic processing, encryption, I/O processing, machine learning, and so on.

"Kernels" include operating systems, hypervisors, virtual machines, BIOS or UEFI code, and similar hardware interface software.

"Code" means processor instructions, data (which includes constants, variables, and data structures), or both instructions and data. "Code" and "software" are used interchangeably herein. Executable code, interpreted code, and firmware are some examples of code.

"Program" is used broadly herein, to include applications, kernels, drivers, interrupt handlers, firmware, state machines, libraries, and other code written by programmers (who are also referred to as developers) and/or automatically generated.

A "routine" is a callable piece of code which normally returns control to an instruction just after the point in a program execution at which the routine was called. Depending on the terminology used, a distinction is sometimes made elsewhere between a "function" and a "procedure": a function normally returns a value, while a procedure does not. As used herein, "routine" includes both functions and procedures. A routine may have code that returns a value (e.g., sin(x)) or it may simply return without also providing a value (e.g., void functions).

"Service" means a consumable program offering, in a cloud computing environment or other network or computing system environment, which provides resources to multiple programs or provides resource access to multiple programs, or does both. A service implementation may itself include multiple applications or other programs.

"Cloud" means pooled resources for computing, storage, and networking which are elastically available for measured on-demand service. A cloud 138 may be private, public, community, or a hybrid, and cloud services may be offered in the form of infrastructure as a service (IaaS), platform as a service (PaaS), software as a service (SaaS), or another service. Unless stated otherwise, any discussion of reading from a file or writing to a file includes reading/writing a local file or reading/writing over a network, which may be a cloud network or other network, or doing both (local and networked read/write). A cloud may also be referred to as a "cloud environment" or a "cloud computing environment".

"Access" to a computational resource includes use of a permission or other capability to read, modify, write, execute, move, delete, create, or otherwise utilize the resource. Attempted access may be explicitly distinguished from actual access, but "access" without the "attempted" qualifier includes both attempted access and access actually performed or provided.

Herein, activity by a user refers to activity by a user device or activity by a user account, or by software on behalf of a user, or by hardware on behalf of a user. Activity is represented by digital data or machine operations or both in a computing system. Activity within the scope of any claim based on the present disclosure excludes human actions per se. Software or hardware activity "on behalf of a user" accordingly refers to software or hardware activity on behalf of a user device or on behalf of a user account or on behalf of another computational mechanism or computational artifact, and thus does not bring human behavior per se within the scope of any embodiment or any claim.

"Digital data" means data in a computing system, as opposed to data written on paper or thoughts in a person's mind, for example. Similarly, "digital memory" refers to a non-living device, e.g., computing storage hardware, not to human or other biological memory.

As used herein, "include" allows additional elements (i.e., includes means comprises) unless otherwise stated.

"Optimize" means to improve, not necessarily to perfect. For example, it may be possible to make further improvements in a program or an algorithm which has been optimized.

"Process" is sometimes used herein as a term of the computing science arts, and in that technical sense encompasses computational resource users, which may also include or be referred to as coroutines, threads, tasks, interrupt handlers, application processes, kernel processes, procedures, or object methods, for example. As a practical matter, a "process" is the computational entity identified by system utilities such as Windows® Task Manager, Linux® ps, or similar utilities in other operating system environments (marks of Microsoft Corporation, Linus Torvalds, respectively). "Process" may also be used as a patent law term of art, e.g., in describing a process claim as opposed to a system claim or an article of manufacture (configured storage medium) claim. Similarly, "method" is used herein primarily as a technical term in the computing science arts (a kind of "routine") but it is also a patent law term of art (akin to a "process"). "Process" and "method" in the patent law sense are used interchangeably herein. Those of skill will understand which meaning is intended in a particular instance, and will also understand that a given claimed process or method (in the patent law sense) may sometimes be implemented using one or more processes or methods (in the computing science sense).

"Automatically" means by use of automation (e.g., general purpose computing hardware configured by software for specific operations and technical effects discussed herein), as opposed to without automation. In particular, steps performed "automatically" are not performed by hand on paper or in a person's mind, although they may be initiated by a human person or guided interactively by a human person. Automatic steps are performed with a machine in order to obtain one or more technical effects that would not be realized without the technical interactions thus provided. Steps performed automatically are presumed to include at least one operation performed proactively.

One of skill understands that technical effects are the presumptive purpose of a technical embodiment. The mere fact that calculation is involved in an embodiment, for example, and that some calculations can also be performed without technical components (e.g., by paper and pencil, or even as mental steps) does not remove the presence of the technical effects or alter the concrete and technical nature of the embodiment, particularly in real-world embodiment implementations. Collaboration feature overlay operations such as receiving 502 a communication sent over a network, maintaining 504 state data about account activity at a collaboration feature 210, deriving 506 a shared collaboration state, and many other operations discussed herein (whether recited in the Figures or not), are understood to be inherently digital. A human mind cannot interface directly with a CPU or other processor, or with RAM or other digital storage, to read and write the necessary data to perform the collaboration feature overlay steps 1200 taught herein even in a hypothetical or actual prototype situation, much less in an embodiment's real world large computing environment. This would all be well understood by persons of skill in the art in view of the present disclosure.

"Computationally" likewise means a computing device (processor plus memory, at least) is being used, and excludes obtaining a result by mere human thought or mere human action alone. For example, doing arithmetic with a paper and pencil is not doing arithmetic computationally as understood herein. Computational results are faster, broader, deeper, more accurate, more consistent, more comprehensive, and/or otherwise provide technical effects that are beyond the scope of human performance alone. "Computational steps" are steps performed computationally. Neither "automatically" nor "computationally" necessarily means "immediately". "Computationally" and "automatically" are used interchangeably herein.

"Proactively" means without a direct request from a user, and indicates machine activity rather than human activity. Indeed, a user may not even realize that a proactive step by an embodiment was possible until a result of the step has been presented to the user. Except as otherwise stated, any computational and/or automatic step described herein may also be done proactively.

"Based on" means based on at least, not based exclusively on. Thus, a calculation based on X depends on at least X, and may also depend on Y.

Throughout this document, use of the optional plural "(s)", "(es)", or "(ies)" means that one or more of the indicated features is present. For example, "processor(s)" means "one or more processors" or equivalently "at least one processor".

"At least one" of a list of items means one of the items, or two of the items, or three of the items, and so on up to and including all N of the items, where the list is a list of N items. The presence of an item in the list does not require the presence of the item (or a check for the item) in an embodiment. For instance, if an embodiment of a system is described herein as including at least one of A, B, C, or D, then a system that includes A but does not check for B or C or D is an embodiment, and so is a system that includes A and also includes B but does not include or check for C or D. Similar understandings pertain to items which are steps or step portions or options in a method embodiment. This is not a complete list of all possibilities, it is provided merely to aid understanding of the scope of "at least one" that is intended herein.

For the purposes of United States law and practice, use of the word "step" herein, in the claims or elsewhere, is not intended to invoke means-plus-function, step-plus-function, or 35 United State Code Section 112 Sixth Paragraph/Section 112(f) claim interpretation. Any presumption to that effect is hereby explicitly rebutted.

For the purposes of United States law and practice, the claims are not intended to invoke means-plus-function interpretation unless they use the phrase "means for". Claim language intended to be interpreted as means-plus-function language, if any, will expressly recite that intention by using the phrase "means for". When means-plus-function interpretation applies, whether by use of "means for" and/or by a court's legal construction of claim language, the means recited in the specification for a given noun or a given verb should be understood to be linked to the claim language and linked together herein by virtue of any of the following: appearance within the same block in a block diagram of the figures, denotation by the same or a similar name, denotation by the same reference numeral, a functional relationship depicted in any of the figures, a functional relationship noted in the present disclosure's text. For example, if a claim limitation recited a "zac widget" and that claim limitation became subject to means-plus-function interpretation, then at a minimum all structures identified anywhere in the specification in any figure block, paragraph, or example mentioning "zac widget", or tied together by any reference numeral assigned to a zac widget, or disclosed as having a functional relationship with the structure or operation of a zac widget, would be deemed part of the structures identified in the application for zac widgets and would help define the set of equivalents for zac widget structures.

One of skill will recognize that this disclosure discusses various data values and data structures, and recognize that such items reside in a memory (RAM, disk, etc.), thereby configuring the memory. One of skill will also recognize that this disclosure discusses various algorithmic steps which are to be embodied in executable code in a given implementation, and that such code also resides in memory, and that it effectively configures any general-purpose processor which executes it, thereby transforming it from a general-purpose processor to a special-purpose processor which is functionally special-purpose hardware.

Accordingly, one of skill would not make the mistake of treating as non-overlapping items (a) a memory recited in a claim, and (b) a data structure or data value or code recited in the claim. Data structures and data values and code are understood to reside in memory, even when a claim does not explicitly recite that residency for each and every data structure or data value or piece of code mentioned. Accordingly, explicit recitals of such residency are not required. However, they are also not prohibited, and one or two select recitals may be present for emphasis, without thereby excluding all the other data values and data structures and code from residency. Likewise, code functionality recited in a claim is understood to configure a processor, regardless of whether that configuring quality is explicitly recited in the claim.

Throughout this document, unless expressly stated otherwise any reference to a step in a process presumes that the step may be performed directly by a party of interest and/or performed indirectly by the party through intervening mechanisms and/or intervening entities, and still lie within the scope of the step. That is, direct performance of the step by the party of interest is not required unless direct performance is an expressly stated requirement. For example, a computational step on behalf of a party of interest, such as accessing, attempting, communicating, deriving, differing, editing, executing, identifying, imposing, indexing, installing, maintaining, modifying, overlapping, persisting, proxying, publishing, receiving, redirecting, replacing, restricting, securing, sending, sharing, supplementing, supplying, updating (and accesses, accessed, attempts, attempted, etc.) with regard to a destination or other subject may involve intervening action, such as the foregoing or such as forwarding, copying, uploading, downloading, encoding, decoding, compressing, decompressing, encrypting, decrypting, authenticating, invoking, and so on by some other party or mechanism, including any action recited in this document, yet still be understood as being performed directly by or on behalf of the party of interest. Example verbs listed here may overlap in meaning or even be synonyms, separate verb names do not dictate separate functionality in every case.

Whenever reference is made to data or instructions, it is understood that these items configure a computer-readable memory and/or computer-readable storage medium, thereby transforming it to a particular article, as opposed to simply existing on paper, in a person's mind, or as a mere signal being propagated on a wire, for example. For the purposes of patent protection in the United States, a memory or other storage device or other computer-readable storage medium is not a propagating signal or a carrier wave or mere energy outside the scope of patentable subject matter under United States Patent and Trademark Office (USPTO) interpretation of the In re Nuijten case. No claim covers a signal per se or mere energy in the United States, and any claim interpretation that asserts otherwise in view of the present disclosure is unreasonable on its face. Unless expressly stated otherwise in a claim granted outside the United States, a claim does not cover a signal per se or mere energy.

Moreover, notwithstanding anything apparently to the contrary elsewhere herein, a clear distinction is to be understood between (a) computer readable storage media and computer readable memory, on the one hand, and (b) transmission media, also referred to as signal media, on the other hand. A transmission medium is a propagating signal or a carrier wave computer readable medium. By contrast, computer readable storage media and computer readable memory and computer readable storage devices are not propagating signal or carrier wave computer readable media. Unless expressly stated otherwise in the claim, "computer readable medium" means a computer readable storage medium, not a propagating signal per se and not mere energy.

An "embodiment" herein is an example. The term "embodiment" is not interchangeable with "the invention". Embodiments may freely share or borrow aspects to create other embodiments (provided the result is operable), even if a resulting combination of aspects is not explicitly described per se herein. Requiring each and every permitted combination to be explicitly and individually described is unnecessary for one of skill in the art, and would be contrary to policies which recognize that patent specifications are written for readers who are skilled in the art. Formal combinatorial calculations and informal common intuition regarding the number of possible combinations arising from even a small number of combinable features will also indicate that a large number of aspect combinations exist for the aspects described herein. Accordingly, requiring an explicit recitation of each and every combination would be contrary to policies calling for patent specifications to be concise and for readers to be knowledgeable in the technical fields concerned.

LIST OF REFERENCE NUMERALS

The following list is provided for convenience and in support of the drawing figures and as part of the text of the specification, which describe aspects of embodiments by reference to multiple items. Items not listed here may nonetheless be part of a given embodiment. For better legibility of the text, a given reference number is recited near some, but not all, recitations of the referenced item in the text. The same reference number may be used with reference to different examples or different instances of a given item. The list of reference numerals is:
- 100 operating environment, also referred to as computing environment; includes one or more systems 102
- 101 machine in a system 102, e.g., any device having at least a processor 110 and a memory 112 and also having a distinct identifier such as an IP address or a MAC (media access control) address; may be a physical machine or be a virtual machine implemented on physical hardware
- 102 computer system, also referred to as a "computational system" or "computing system", and when in a network may be referred to as a "node"
- 104 users, e.g., user of an enhanced system 202
- 106 peripheral device
- 108 network generally, including, e.g., LANs, WANs, software-defined networks, clouds, and other wired or wireless networks
- 110 processor or set of processors; includes hardware
- 112 computer-readable storage medium, e.g., RAM, hard disks; also referred to as storage device
- 114 removable configured computer-readable storage medium
- 116 instructions executable with processor; may be on removable storage media or in other memory (volatile or nonvolatile or both)
- 118 digital data in a system 102; data structures, values, source code, and other examples are discussed herein 120 kernel(s), e.g., operating system(s), BIOS, UEFI, device drivers; also refers to an execution engine such as a language runtime 122 software tools, software applications, security controls; hardware tools; computational 126 display screens, also referred to as "displays"

128 computing hardware not otherwise associated with a reference number 106, 108, 110, 112, 114

130 user account in a computing system; also referred to informally at times as a user 132 web application, also referred to as web app or website or site; social media app is an example; some but not all web apps follow a software-as-a-service model; access to some but not all web apps is conditioned on registration of a user account with the web app 134 user interface of a web app; also refers to program-to-program interface of a web app such as an API 136 web app user interface URL or portion thereof, e.g., domain name; also referred to as the web app's address 138 cloud, also referred to as cloud environment or cloud computing environment 202 enhanced computing system, i.e., system 102 enhanced with functionality 204 as taught herein 204 collaboration feature overlay functionality (also referred to as functionality 204), e.g., software or specialized hardware which performs or is configured to perform steps 504, 506, and 508, or steps 1210, 506, and 508, or steps 1210 and 1212 to enable one or more of step 1208 or step 1220 or step 506, or any software or hardware which performs or is configured to perform a novel method 1200 or a computational collaboration feature overlay functionality activity first disclosed herein 206 computationally overlay at least one website by at least one collaboration capability such that a network communication directed at the website goes first to the code implementing the collaboration capability; may be accomplished, e.g., by redirection 1202 or otherwise intercepting the network communication; an overlaid website is also referred to as an underlying website; 206 also refers to an architecture in which at least one website is overlaid by at least one collaboration capability implementation (i.e., at least one collaboration feature)

208 computationally collaborate or facility collaboration; collaboration involves deriving 506 a shared state 306 from communications from at least two user accounts 130 and supplying 508 the user accounts with respective copies of at least part of the derived shared state 306

210 collaboration feature, also referred to as CF or CF 210; a computational implementation of at least one collaboration capability, e.g., shared document, user group, shared workspace 212 suffix proxy; also referred to as proxy or proxy server or proxy solution; computational 214 client in a server-client relationship in a computer network; may also or instead be a peer in a peer-to-per network, although for clarity of illustration "peer" is not recited in the drawings 302 network communication; digital 304 activity state outside a web app 132 based on individual user account, also referred to as individual state; as utilized herein, an example of a collaboration state; digital data 306 shared state outside a web app 132 based on multiple individual user accounts, also referred to as shared content or shared collaboration state, or by particular examples such as a chat room or updated proxy page; as utilized herein, an example of a collaboration state; digital data 308 copy of at least a portion of a shared state 306; digital data 310 checklist; digital data, in some cases with associated routines 312 chat or chat room; digital data, in some cases with associated routines 314 remarks or comments; digital data, in some cases with associated routines 316 calendar, also refers to calendar event; digital data, in some cases with associated routines 318 project plan or project status; digital data, in some cases with associated routines 320 video conference; computational activity or associate data or both 322 video conference engine; computational 324 interface generally in a computing system; computational, digital 402 uniform resource locator (URL); digital 404 access attempt or actual access generally; computational activity or data representing such activity in a computing system 406 per-user-account basis; a characteristic of computational activity which distinguishes between user accounts, or data representing such activity in a computing system 408 domain name; digital 410 portion of a domain name, e.g., substring 412 cybersecurity procedure, cybersecurity mechanism, or other cybersecurity requirement, in a computing system; human activity per se is not included in item 412

416 user account authentication; computational activity (not necessarily successful) or data representing such activity in a computing system 418 data encryption; computational activity or data representing such activity in a computing system 420 digital certificate 422 digital chain of digital certificates 424 digital representation of a document 460, a chat or chatroom 312, a collection of remarks 314, or other content created collaboratively 426 execution in a computing system of a collaboration feature; refers to computational activity of executing software, or to an instance of such computational activity 428 software vendor, hardware vendor, data vendor, or service vendor, as represented in a computing system 430 company, agency, institution, or other legally recognized entity, as represented in a computing system 432 machine learning model in a computing system, e.g., language model, large language model (LLM), multi-modal language model, or foundation model; two kinds of model are discussed in this disclosure, namely, a model 432 within or accessed via a web app 132, and a model 432 within or accessed by a collaboration feature 210 to automatically identify communications that involve collaboration so the CF 210 can determine whether to merely forward the communication to the underlying web app (this is done with non-collaborative communications such as web app account balance inquiries) or instead process the communication at least in part in the CF 210 (this is done with collaborative communications, e.g., by maintaining 504 state)

434 prompt for a machine learning model, as represented in a computing system

436 collaborative workspace in a computing system

438 collaboration capability implementation built into a web app, e.g., implemented in code 438 which is part of the web app body 602

440 digital data representing or maintained by built-in collaboration functionality 438, e.g., shared state 604 and individual state 606; resides within a web application body 602

442 derived digital data (a.k.a. content) in a collaboration feature overlay functionality 204 which is not available (not created or updated or retrieved or produced) by operation of the overlaid web application's built-in collaboration functionality 438

444 secure sockets layer (SSL) or transport layer security (TLS) computational activity or data representing or enabling such activity in a computing system

446 SSL or TLS digital certificate

448 collaboration feature 210 user interface; also refers to program-to-program interface of a collaboration feature 210 such as an API

450 collaboration feature interface 448 URL or portion thereof

452 proxy 212 interface URL or portion thereof; in some scenarios in which CF 210 is integrated with proxy 212, the proxy interface URL 452 serves as a collaboration feature interface URL 450

454 group of users (i.e., group of user accounts), as represented in a computing system

456 data structure generally, in a computing system

458 communication 302 identifier; digital

460 digital document in a computing system, e.g., natural language file, source code file, executable code file, script file, image file, web page specification file, calendar, checklist, project status or planning file, chat transcript, computer aided design file, spreadsheet file, or other file containing data entered by a user into a computing system

500 flowchart; 500 also refers to collaboration feature overlay methods that are illustrated by or consistent with the FIG. 5 flowchart or any variation of the FIG. 5 flowchart described herein

502 computationally receive a network communication, e.g., via an API

504 computationally maintain individual account states 304 for respective user accounts 130, e.g., by adding to, updating, or otherwise maintaining a data structure populated with timestamped copies of content submissions and commands received 502 at the collaboration feature 210 in the user account, e.g., chat entries 312, document edits 1220, comments 314, calendar 316 entries, and so on

506 computationally derive a shared state 306 from individual account states 304, e.g., by assembling chat entries of multiple user accounts into a chat session transcript, updating a shared document with edits 1220 by multiple user accounts, or adding to, updating, or otherwise changing values in a workspace data structure 436, and so on

508 computationally supply multiple user accounts with a copy of at least a portion of a shared state 306, e.g., a current version of a shared document, a month from a shared calendar, a transcript of chat entries from specified users, and so on; accomplished, e.g., through an API and network communication; also referred to as sending 508 the portion

600 architecture diagram; also refers to collaboration feature overlay methods and collaboration feature overlay computing systems that are illustrated by or consistent with the FIG. 6 architecture diagram, including for example computing systems in which some clients communicate directly with a web app 132 containing collaboration code 438 as shown in FIG. 6 and other clients (or the same clients at different times) communicate indirectly with that same collaborative web app via a suffix proxy 212 and an associated collaboration feature 210 which supplements or replaces a collaboration capability of the web app collaboration code 438

602 web app body generally, i.e., internal web app code and internal web app state, in a computing system

604 shared state within a web app 132 based on multiple individual user accounts, also referred to as shared content; digital data

606 activity state within a web app 132 based on individual user account, also referred to as individual state; as utilized herein, an example of a collaboration state; digital data

700 architecture diagram; also refers to collaboration feature overlay methods and collaboration feature overlay computing systems that are illustrated by or consistent with the FIG. 7 architecture diagram

702 code in an enhanced proxy 212 or a collaboration feature which implements a collaboration capability, e.g., shared document editing, shared calendar event addition or modification or removal, a chat room, and so on; external to any code 438 of a web app itself

704 code within a web app which implements collaborative or non-collaborative activity of an individual user account corresponding to interaction between the individual user account and the web app

800 architecture diagram; also refers to collaboration feature overlay methods and collaboration feature overlay computing systems that are illustrated by or consistent with the FIG. 8 architecture diagram

900 architecture diagram; also refers to collaboration feature overlay methods and collaboration feature overlay computing systems that are illustrated by or consistent with the FIG. 9 architecture diagram

1000 architecture diagram; also refers to collaboration feature overlay methods and collaboration feature overlay computing systems that are illustrated by or consistent with the FIG. 10 architecture diagram

1100 architecture diagram; also refers to collaboration feature overlay methods and collaboration feature overlay computing systems that are illustrated by or consistent with the FIG. 10 architecture diagram

1200 flowchart; 1200 also refers to collaboration feature overlay methods that are illustrated by or consistent with the FIG. 12 flowchart, which incorporates the FIG. 5 flowchart and other steps taught herein, or methods that are illustrated by or consistent with any variation of the FIG. 5 or FIG. 12 flowchart described herein

1202 computationally redirect a network communication, e.g., by changing a routing table, environment file, firewall setting, browser setting, or a combination thereof

1204 computationally detect or rely on or cause an overlap in two domain names, e.g., "contoso.contososaas.com.reverseproxy.com" overlaps "contoso.contososaas.com"

1206 computationally detect or rely on or cause a difference in two domain names, e.g., "contoso.contososaas.com.reverseproxy.com" differs from "contoso.contososaas.com"

1208 computationally impose a cybersecurity requirement, also referred to as restricting computational activity due to a cybersecurity requirement; see also securing 1218

1210 computationally install a collaboration feature, e.g., by placing the collaboration feature in a computing system and adding or updating settings that will, in operation of the computing system, redirect 1202 a communication so the communication goes to the collaboration feature overlaying a website 132 instead of going directly to that website

1212 avoid computationally modifying a web app body, e.g., by not changing the source code which defines part of the web app body as part of a collaboration feature installation 1210

1214 computationally modify a web app body, e.g., by changing the source code which defines part of the web app body and recompiling that source code and placing a resulting executable code in the web app in a network

1216 computationally publish software, e.g., by declaring to an audience that the software is available and by providing access to a copy of the software

1218 computationally secure a piece of software or digital data or a digital communication, e.g., by utilizing encryption, intrusion detection, exfiltration detection, malware detection, user authentication, user activity anomaly detection, or other cybersecurity tools or techniques to reduce risk that the secured item will lose part or all of its confidentiality, integrity, availability, or privacy; securing 1218 tends to focus on the item secured whereas restricting 1208 tends to focus on a tool or technique usable for securing 1218, but they are otherwise interchangeable for present purposes

1220 computationally edit a shared document, e.g., by adding, removing, or altering content of the document; also refers to edits as represented in a computing system

1222 computationally send a communication, e.g., via an API

1224 computationally receive a communication, e.g., via an API

1226 computationally supplement, in a data flow, some data (or corresponding computational activity) that was produced by or received from a built-in collaboration capability of a website 132

1228 computationally replace, in a data flow, some data (or corresponding computational activity) that was produced by or received from a built-in collaboration capability of a website 132

1230 computationally track communications on a per-user-account basis, e.g., by adding to, updating, or otherwise modifying a data structure populated with timestamped copies of communications received 502 at the collaboration feature 210 in the user account or populated with summaries or identifiers of such communications

1232 computationally attempt to access a collaboration feature 210, e.g., via an API

1234 computationally attempt to access a shared collaboration state 306, e.g., via an API

1236 any step or item discussed in the present disclosure that has not been assigned some other reference numeral; 1236 may thus be shown expressly as a reference numeral for various steps or items or both, and may be added as a reference numeral (in the current disclosure or any subsequent patent application which claims priority to the current disclosure) for various steps or items or both without thereby adding new matter

CONCLUSION

In some embodiments, a collaboration feature 210 overlays a web application 132 by receiving 502 a network communication 302 that was redirected 1202 from the web application by a suffix proxy 212. The collaboration feature supplements 1226 or replaces 1228 activity of the web application by maintaining 504 per-user-account activity states 304, deriving 506 a shared collaboration state 306 from the activity states, and supplying 508 the shared collaboration state to multiple user accounts 130. Modifying 1214 the web application is not required to install 1210 or execute 426 the collaboration feature 210. The collaboration feature provides user accounts 130 with a collaboration capability, such as shared document editing 1220, chat rooms 312, shared calendars 316, or shared private workspaces 436. Some collaboration features 210 overlay multiple web applications 132, even from different vendors 428, and some collaboration features support posting collaboratively created content 442 to a website 132 even when some contributors to the content are not registered users of the website. Some collaboration features 210 impose 1208 stricter or different cybersecurity requirements 412 than an underlying website 132.

Embodiments are understood to also themselves include or benefit from tested and appropriate security controls and privacy controls such as the General Data Protection Regulation (GDPR). Use of the tools and techniques taught herein is compatible with use of such controls.

Although Microsoft technology is used in some motivating examples, the teachings herein are not limited to use in technology supplied or administered by Microsoft. Under a suitable license, for example, the present teachings could be embodied in software or services provided by other cloud service providers.

Although particular embodiments are expressly illustrated and described herein as processes, as configured storage media, or as systems, it will be appreciated that discussion of one type of embodiment also generally extends to other embodiment types. For instance, the descriptions of processes in connection with the Figures also help describe configured storage media, and help describe the technical effects and operation of systems and manufactures like those discussed in connection with other Figures. It does not follow that any limitations from one embodiment are necessarily read into another. In particular, processes are not necessarily limited to the data structures and arrangements presented while discussing systems or manufactures such as configured memories.

Those of skill will understand that implementation details may pertain to specific code, such as specific thresholds, comparisons, specific kinds of platforms or programming languages or architectures, specific scripts or other tasks, and specific computing environments, and thus need not appear in every embodiment. Those of skill will also understand that program identifiers and some other terminology used in discussing details are implementation-specific and thus need not pertain to every embodiment. Nonetheless, although they are not necessarily required to be present here, such details may help some readers by providing context and/or may illustrate a few of the many possible implementations of the technology discussed herein.

With due attention to the items provided herein, including technical processes, technical effects, technical mechanisms, and technical details which are illustrative but not comprehensive of all claimed or claimable embodiments, one of skill will understand that the present disclosure and the embodiments described herein are not directed to subject matter outside the technical arts, or to any idea of itself such as a principal or original cause or motive, or to a mere result per se, or to a mental process or mental steps, or to a business method or prevalent economic practice, or to a mere method of organizing human activities, or to a law of nature per se, or to a naturally occurring thing or process, or to a living thing or part of a living thing, or to a mathematical formula per se, or to isolated software per se, or to a merely conventional computer, or to anything wholly imperceptible or any abstract idea per se, or to insignificant post-solution activities, or to any method implemented entirely on an unspecified apparatus, or to any method that fails to produce results that are useful and concrete, or to any preemption of all fields of usage, or to any other subject matter which is ineligible for patent protection under the laws of the jurisdiction in which such protection is sought or is being licensed or enforced.

Reference herein to an embodiment having some feature X and reference elsewhere herein to an embodiment having some feature Y does not exclude from this disclosure embodiments which have both feature X and feature Y, unless such exclusion is expressly stated herein. All possible negative claim limitations are within the scope of this disclosure, in the sense that any feature which is stated to be part of an embodiment may also be expressly removed from inclusion in another embodiment, even if that specific exclusion is not given in any example herein. The term "embodiment" is merely used herein as a more convenient form of "process, system, article of manufacture, configured computer readable storage medium, and/or other example of the teachings herein as applied in a manner consistent with applicable law." Accordingly, a given "embodiment" may include any combination of features disclosed herein, provided the embodiment is consistent with at least one claim.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific technical effects or technical features of an example may be omitted, renamed, grouped differently, repeated, instantiated in hardware and/or software differently, or be a mix of effects or features appearing in two or more of the examples. Functionality shown at one location may also be provided at a different location in some embodiments; one of skill recognizes that functionality modules can be defined in various ways in a given implementation without necessarily omitting desired technical effects from the collection of interacting modules viewed as a whole. Distinct steps may be shown together in a single box in the Figures, due to space limitations or for convenience, but nonetheless be separately performable, e.g., one may be performed without the other in a given performance of a method.

Reference has been made to the figures throughout by reference numerals. Any apparent inconsistencies in the phrasing associated with a given reference numeral, in the figures or in the text, should be understood as simply broadening the scope of what is referenced by that numeral. Different instances of a given reference numeral may refer to different embodiments, even though the same reference numeral is used. Similarly, a given reference numeral may be used to refer to a verb, a noun, and/or to corresponding instances of each, e.g., a processor 110 may process 110 instructions by executing them.

As used herein, terms such as "a", "an", and "the" are inclusive of one or more of the indicated item or step. In particular, in the claims a reference to an item generally means at least one such item is present and a reference to a step means at least one instance of the step is performed. Similarly, "is" and other singular verb forms should be understood to encompass the possibility of "are" and other plural forms, when context permits, to avoid grammatical errors or misunderstandings.

Headings are for convenience only; information on a given topic may be found outside the section whose heading indicates that topic.

All claims and the abstract, as filed, are part of the specification. The abstract is provided for convenience and for compliance with patent office requirements; it is not a substitute for the claims and does not govern claim interpretation in the event of any apparent conflict with other parts of the specification. Similarly, the summary is provided for convenience and does not govern in the event of any conflict with the claims or with other parts of the specification. Claim interpretation shall be made in view of the specification as understood by one of skill in the art, it is not required to recite every nuance within the claims themselves as though no other disclosure was provided herein.

To the extent any term used herein implicates or otherwise refers to an industry standard, and to the extent that applicable law requires identification of a particular version of such as standard, this disclosure shall be understood to refer to the most recent version of that standard which has been published in at least draft form (final form takes precedence if more recent) as of the earliest priority date of the present disclosure under applicable patent law.

While exemplary embodiments have been shown in the drawings and described above, it will be apparent to those of ordinary skill in the art that numerous modifications can be made without departing from the principles and concepts set forth in the claims, and that such modifications need not encompass an entire abstract concept. Although the subject matter is described in language specific to structural features and/or procedural acts, it is to be understood that the subject matter defined in the appended claims is not necessarily limited to the specific technical features or acts described above the claims. It is not necessary for every means or aspect or technical effect identified in a given definition or example to be present or to be utilized in every embodiment. Rather, the specific features and acts and effects described are disclosed as examples for consideration when implementing the claims.

All changes which fall short of enveloping an entire abstract idea but come within the meaning and range of equivalency of the claims are to be embraced within their scope to the full extent permitted by law.

What is claimed is:

1. A method of providing a collaboration feature which overlays at least a portion of a web application, the method comprising automatically:
   receiving at a collaboration feature interface of the collaboration feature a suffix proxy communication from a web application interface URL of the web application;
   maintaining in the collaboration feature, on a per-user-account basis, collaboration activity states representing activities on the collaboration feature which are associated with the web application;

deriving a shared collaboration state of the collaboration feature from respective collaboration activity states of multiple user accounts; and supplying a copy of at least a portion of the shared collaboration state to each of a plurality of the multiple user accounts.

2. The method of claim 1, comprising:

receiving at a collaboration feature interface URL a communication that was redirected from the web application interface URL by the suffix proxy, the collaboration feature interface URL having a domain name portion which overlaps but differs from a domain name portion of the web application interface URL;

receiving at the collaboration feature interface URL a second communication that was redirected from a second web application interface URL by a second suffix proxy, the collaboration feature interface URL domain name portion overlapping but differing from a second domain name portion of the second web application interface URL;

maintaining, on the per-user-account basis, the activity states representing activities on the collaboration feature which are associated with the web application;

maintaining, on the per-user-account basis, second activity states representing second activities on the collaboration feature which are associated with the second web application;

deriving a shared collaboration state from respective collaboration activity states of multiple user accounts representing the activities and the second activities; and supplying the copy of at least a portion of the shared collaboration state to each of the plurality of the multiple user accounts.

3. The method of claim 1, further comprising redirecting the communication from the web application interface URL to the collaboration feature interface.

4. The method of claim 1, further comprising restricting at least one of: an attempt by a user account to access the collaboration feature, or an attempt by the user account to access the shared collaboration state, wherein the restricting comprises imposing a cybersecurity access requirement that is not imposed on a successful attempt by the user account to access the web application directly at the web application interface URL.

5. The method of claim 1, further comprising installing the collaboration feature without modifying the web application.

6. The method of claim 1, wherein the supplying supplies to each of the plurality of the multiple user accounts the copy of the shared collaboration state, and the shared collaboration state comprises a digital representation containing content from at least two of the multiple user accounts, the digital representation representing at least one of: a document, a chat, or a collection of remarks.

7. A computing system configured with a collaboration feature which overlays at least a portion of a web application, the web application having a web application body and having a web application interface located at a web application interface URL, the system comprising:

the collaboration feature, the collaboration feature having a collaboration feature interface;

a digital memory set comprising at least one digital memory, the digital memory set containing multiple per-user-account basis collaboration activity states collectively representing activities on the collaboration feature which are associated with the web application;

a processor set comprising at least one processor, the processor set in operable communication with the digital memory, the processor set configured to perform an execution of the collaboration feature, the collaboration feature execution comprising receiving at the collaboration feature interface a communication that was redirected from the web application interface URL by a suffix proxy, maintaining collaboration activity states on a per-user-account basis, deriving a shared collaboration state from respective collaboration activity states of multiple user accounts, and supplying a copy of at least a portion of the shared collaboration state to each of a plurality of the multiple user accounts.

8. The computing system of claim 7, further characterized by at least one of:

the collaboration feature is published by a first vendor, and the web application is published by a second vendor which differs from the first vendor;

the collaboration feature interface is located at a collaboration feature interface URL, the collaboration feature interface URL is secured by a first secure sockets layer certificate chain, and the web application interface URL is simultaneously secured by a second secure sockets layer certificate chain which differs from the first secure sockets layer certificate chain; or the collaboration feature interface is located at a collaboration feature interface URL, the collaboration feature interface URL is secured by a first certificate assigned to a first organization, the web application interface URL is secured by a second certificate assigned to a second organization which differs from the first organization, and each certificate includes an extended validation secure sockets layer certificate or an organization validation secure sockets layer certificate.

9. The computing system of claim 7, wherein the collaboration feature overlays the web application, the collaboration feature is published by a first vendor, the web application is published by a second vendor which differs from the first vendor, the collaboration feature also overlays a second web application, and the second web application is published by a third vendor which differs from the second vendor and also differs from the first vendor.

10. The computing system of claim 7, wherein the collaboration feature comprises at least one of:

a multi-user-account chat room;

a multi-user-account document editor which upon execution edits a shared document;

a multi-user-account shared event calendar;

a multi-user-account shared project plan;

a multi-user-account shared checklist; or a multi-user-account video conference engine.

11. The computing system of claim 7, further comprising the suffix proxy.

12. The computing system of claim 7, further characterized by at least one of:

the collaboration feature comprises a multi-user-account chat room which is accessible to at least three of the multiple user accounts for a shared chat, and the web application does not contain any multi-user-account chat room;

the collaboration feature comprises a multi-user-account document editor which is accessible to at least three of the multiple user accounts for editing a shared document, and the web application does not contain any multi-user-account document editor;

the collaboration feature comprises a multi-user-account shared event calendar which is accessible to at least three of the multiple user accounts, and the web application does not contain any multi-user-account shared event calendar;

the collaboration feature comprises a multi-user-account shared project plan which is accessible to at least three of the multiple user accounts, and the web application does not contain any multi-user-account shared project plan;

the collaboration feature comprises a multi-user-account shared checklist which is accessible to at least three of the multiple user accounts, and the web application does not contain any multi-user-account shared checklist; or the collaboration feature comprises a multi-user-account video conference engine which is accessible to at least three of the multiple user accounts for video conferencing with one another, and the web application does not contain any multi-user-account video conference engine.

13. The computing system of claim 7, further characterized by at least one of:

the collaboration feature comprises a multi-user-account source code document editor which is accessible to at least three of the multiple user accounts for editing a shared source code document, and the web application does not contain any multi-user-account source code document editor;

the collaboration feature comprises a multi-user-account presentation document editor which is accessible to at least three of the multiple user accounts for editing a shared presentation document, and the web application does not contain any multi-user-account presentation document editor; or the collaboration feature comprises a multi-user-account spreadsheet document editor which is accessible to at least three of the multiple user accounts for editing a shared spreadsheet document, and the web application does not contain any multi-user-account spreadsheet document editor.

14. The computing system of claim 7, wherein the collaboration feature overlays a plurality of web applications, and wherein the collaboration feature execution comprises:

receiving at a collaboration feature interface URL communications redirected from respective interfaces of each of the plurality of web applications; and deriving the shared collaboration state from respective collaboration activity states which collectively correspond to the plurality of web applications.

15. The computing system of claim 7, wherein the web application includes a generative machine learning model, and the collaboration feature includes a secured collaborative prompt engineering workspace that is accessible only to authenticated user accounts of the collaboration feature.

16. A computer-readable storage device configured with data and instructions which upon execution by a processor cause a computing system to perform a method of providing a collaboration feature which overlays at least a portion of a web application, the web application having a web application body and having a web application interface located at a web application interface URL, the method comprising the collaboration feature automatically:

receiving at a collaboration feature interface URL a communication that was redirected from the web application interface URL by a suffix proxy, the collaboration feature interface URL having a domain name portion which overlaps but differs from a domain name portion of the web application interface URL;

tracking on a per-user-account basis communications with the collaboration feature via the collaboration feature interface URL;

maintaining, on the per-user-account basis, activity states representing activities on the collaboration feature which are associated with the web application;

deriving a shared collaboration state from respective collaboration activity states of multiple user accounts; and supplying a copy of at least a portion of the shared collaboration state to each of a plurality of the multiple user accounts.

17. The computer-readable storage device of claim 16, wherein the web application includes a built-in collaboration functionality, and wherein the shared collaboration state comprises derived data which is not available by operation of the web application built-in collaboration functionality.

18. The computer-readable storage device of claim 16, wherein the web application includes a built-in collaboration functionality, and wherein the shared collaboration state includes derived data which replaces web application data that was produced by operation of the web application built-in collaboration functionality.

19. The computer-readable storage device of claim 16, further comprising imposing a cybersecurity authentication requirement that is not imposed on a successful attempt by one of the multiple user accounts to access the web application directly at the web application interface URL.

20. The computer-readable storage device of claim 16, further comprising imposing a cybersecurity encryption requirement that is not imposed by the web application.

* * * * *